(12) United States Patent
Levy

(10) Patent No.: US 8,626,820 B1
(45) Date of Patent: Jan. 7, 2014

(54) PEER TO PEER CODE GENERATOR AND DECODER FOR DIGITAL SYSTEMS

(75) Inventor: Richard S. Levy, Milpitas, CA (US)

(73) Assignee: Peer Fusion, Inc., Milpitas, CA (US)

( * ) Notice: Subject to any disclaimer, the term of this patent is extended or adjusted under 35 U.S.C. 154(b) by 427 days.

(21) Appl. No.: 12/701,884

(22) Filed: Feb. 8, 2010

Related U.S. Application Data

(63) Continuation of application No. 10/763,008, filed on Jan. 21, 2004, now abandoned.

(60) Provisional application No. 60/441,822, filed on Jan. 21, 2003.

(51) Int. Cl.
*G06F 15/16* (2006.01)
*G06F 13/00* (2006.01)
*G06F 11/00* (2006.01)

(52) U.S. Cl.
USPC .......................... 709/201; 711/114; 714/6.22

(58) Field of Classification Search
USPC ................... 709/201; 707/697–699; 714/746, 714/752–762, 6.22–6.24; 711/114
See application file for complete search history.

(56) References Cited

U.S. PATENT DOCUMENTS

| | | | |
|---|---|---|---|
| 5,588,121 A | 12/1996 | Reddin et al. | |
| 5,636,355 A | 6/1997 | Ramakrishnan et al. | |
| 6,081,907 A * | 6/2000 | Witty et al. | 714/6.1 |
| 6,173,374 B1 | 1/2001 | Heil et al. | |
| 6,928,578 B2 * | 8/2005 | Archibald et al. | 714/6.12 |
| 6,934,904 B2 | 8/2005 | Talagala et al. | |
| 7,287,180 B1 | 10/2007 | Chen et al. | |
| 7,412,433 B2 | 8/2008 | Anglin et al. | |
| 2001/0012442 A1 * | 8/2001 | Kodama | 386/98 |
| 2002/0131423 A1 | 9/2002 | Chan et al. | |
| 2002/0133491 A1 | 9/2002 | Sim et al. | |
| 2002/0162109 A1 | 10/2002 | Shteyn | |
| 2002/0194428 A1 | 12/2002 | Green | |

(Continued)

OTHER PUBLICATIONS

Patterson D.A. et al., "A Case for Redundant Arrays of Inexpensive Disks (RAID)," Proceedings of the International Conference on Management of Data (SIGMOD), Jun. 1988, 25pp.

(Continued)

*Primary Examiner* — Jeong S Park
(74) *Attorney, Agent, or Firm* — Haynes Beffel & Wolfeld LLP; Warren S. Wolfeld

(57) ABSTRACT

Digital content from a source (e.g., a file or a stream), is striped and encoded in parallel over a cluster of Storage Systems. The encoding ensures that subsequent retrieval of the data succeeds even when some members of the cluster of Storage Systems are lost or when errors in communication result in the loss of some IP packets. Host Map File (HMF) data is produced that describes fully how to retrieve the content, including the encoding parameters, the cluster of Storage Systems and the striping of the encoded data. This HMF data is then inserted as the header of every encoded file on the cluster of Storage Systems. The HMF data is the only way the encoded files can be reassembled into a meaningful whole. The original content is retrieved by requesting its data from the cluster of Storage Systems. In each Storage System, a decoder parses the HMF data and transmits the striped data to the requestor. The decoders cooperate to dynamically detect erasures and to reconstruct the missing data. The system is self-healing as new Storage Systems are able to reconstruct data missing due to the loss of any Storage Systems from the cluster without impeding concurrent encode and decode transactions.

5 Claims, 18 Drawing Sheets

(56) References Cited

U.S. PATENT DOCUMENTS

| | | |
|---|---|---|
| 2003/0033308 A1 | 2/2003 | Patel et al. |
| 2003/0084020 A1* | 5/2003 | Shu ................................. 707/1 |
| 2003/0120723 A1 | 6/2003 | Bright et al. |
| 2003/0236961 A1 | 12/2003 | Qiu et al. |
| 2004/0249972 A1 | 12/2004 | White et al. |
| 2005/0015460 A1 | 1/2005 | Gole et al. |
| 2005/0223102 A1 | 10/2005 | Zhang et al. |
| 2005/0273686 A1 | 12/2005 | Turner et al. |
| 2005/0283537 A1 | 12/2005 | Li et al. |
| 2006/0069800 A1 | 3/2006 | Li |
| 2006/0206889 A1 | 9/2006 | Ganesan et al. |
| 2006/0212782 A1 | 9/2006 | Li |
| 2006/0224760 A1 | 10/2006 | Yu et al. |
| 2008/0282298 A1 | 11/2008 | Ganesan et al. |

OTHER PUBLICATIONS

Lawler, S., "Active/Active Controller Configuration Overview and Best Practice Guidelines—FAS Systems with Data ONTAPa 7G," Network Applicance, Inc., Jan. 2007, 21 pp.

EMC2 white paper, "EMC CLARiiON High Availability (HA)—Best Practices Planning," Apr. 2007, 19 pp.

SNIA Technical Position, "Common RAID Disk Data Format Specification," Rev. 1.2 with Errata A Applied, Aug. 2007, 96 pp.

Search Report citing articles in Plank, J.S., "A Tutorial on Reed-Solomon Coding for Fault-Tolerance in RAID-like Systems," Software Practice and Experience, John Wiley & Sons, Inc., NY, 1997, vol. 27, No. 9, pp. 995-1012 [retrieved online on Oct. 8, 2003]—Retrieved from Internet: <URL:http://citeseer.nj.nec.com/context/158301/41070>.

Portion of text from: Rowstron, Druschel, "Storage Management and Caching in Past, a Large Scale . . . " 2001, 3 sections.

Portion of text from: Xin, Miller, Schwarz . . . , "Reliability Mechanisms for Very Large Storage Systems" 2003.

Portion of text from: Weatherspoon, Wells, Eaton, Silverback: A Global-Scale Archival System, 2001.

Portion of text from: Kubiatowicz, Bindel . . . , "OceanStore: An Architecture for Flobal-Scale . . . " 2000.

Portion of text from Bindle, Chen, Eaton, Geels . . . , "OceanStore: An Extremely Wide-Area Storage System" 2000.

Portion of text from Halvorsen, Plagemann . . . , "Integrated Storage and Communication System Error . . . " 2000.

Portion of text from: Havinga, "Energy Efficiency of Error Correction on Wireless Systems" 1999 (2 sections).

Portion of text from: Havinga, "Energy Efficiency of Error Correcting Mechanisms for Wireless . . . " 1998.

Portion of text from: Wael Elwasif James, "IBP-Mail: Controlled Delivery of Large Mail Files" 1999.

Portion of text from: Plant, "Improving the Performance of Coordinated Checkpointers on Networks . . . " 1996.

Portion of text from: Plank, James, "The Average Availability of Multiprocessor Checkpointing Systems" 1998.

Portion of text from Plank, Kim, "Fault Tolerant Matrix Operations for Networks of Workstations . . . " 1997.

Portion of text from: Plant, Li, Puening, "Diskless Checkpointing" 1997.

Hartman, J.H., "The Zebra Striped Network File System," Dissertation, University of California, Berkeley, 1994, 159 pages.

McAuley, A.J., "Reliable Broadband Communication Using a Burst Erasure Correcting Code," ACM SIGCOMM '90, Sep. 1990, pp. 1-10, Philadelphia, PA.

Plank, J.S., "A Tutorial on Reed-Solomon Coding for Fault-Tolerance in RAID-Like Systems," University of Tennesee, Feb. 19, 1999, p. 1-19.

Rabin, M.O., "Efficient Dispersal of Information for Security, Load Balancing, and Fault Tolerance," Journal of the Association for Computing Machinery, Apr. 1989, pp. 335-348, vol. 36, No. 2.

Rizzo, L., et al., "Effective Erasure Codes for Reliable Computer Communication Protocols," ACM Computer Communication Review, Apr. 1997, pp. 24-36, vol. 27, No. 2.

Rowstron, A. et al., "Storage Management and Caching in Past, a Large-Scale, Persistent Peer-To-Peer Storage Utility," ACM, 2001, 13 pages.

Xin, Q. et al., "Evaluation of Distributed Recovery in Large-Scale Storage Systems," Proceedings of the 13th IEEE International Symposium on High Performance Distributed Computing, Jun. 2004, 10 pages, Honolulu, HI.

Office Action mailed Jun. 27, 2011 in U.S. Appl. No. 12/847,994.

Sun Microsystems, Inc. white paper for Solaris ZFS™, 2008, 16 pp.

Seltzer M. et al., "A New Hashing Package for UNIX," presented at USENIX—Winter '91—Dallas, TX, 12 pp.

Hewlett Packard Administrator's Guide, Veritas Volume Manager 3.1, for HP-UX 11i and HP-UX 11i Vrsion 1.5, Jun. 2001, 432 pp.

Litwin, W., "Linear Hashing: A New Tool for File and Table Addressing," IEEE 1980, pp. 212-223.

EMC 2 white paper, "EMC Symmetrix DMX-4 Ultra-Performance Tier 0 Using Flash Drives," Jun. 2008, 12 pp.

Tang, H. et al., "Differentiated object placement and location for self-organizing storage clusters," Technical Report 2002-32, UCSB, Nov. 2002, 14 pp.

Bakkaloglu, M., et al. "On correlated failures in survivable storage systems." Information Systems Journal May 2002, 2pp.

Wells, C., "The OceanStore archive: Goals, structures, and self-repair," U.C. Berkeley Masters Report, May 2002, 20pp.

Office Action mailed Sep. 8, 2011 in U.S. Appl. No. 12/556,518, 10pp.

Response filed Mar. 1, 2012 to Office Action mailed Sep. 8, 2011 in U.S. Appl. No. 12/556,518, 10pp.

Applicant-Initiated Interview Summary mailed Feb. 23, 2012, 3pp.

Final Office Action mailed May 14, 2012 in U.S. Appl. No. 12/556,518, 6pp.

Applicant-Initiated Interview Summary mailed Jun. 27, 2012 in, 3pp.

Response B filed Jun. 25, 2012 to final office action mailed May 14, 2012 in, 9pp.

Notice of Allowance mailed Jul. 18, 2012 in U.S. Appl. No. 12/556,518, 7pp.

Office Action mailed Nov. 5, 2012 in U.S. Appl. No. 13/550,350, 6pp.

* cited by examiner $$\begin{bmatrix} 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix}$$

Figure 2

$$\begin{bmatrix} 1 & 0 & 0 & \cdots & 0 \\ 0 & 1 & 0 & \cdots & 0 \\ \vdots & \vdots & \vdots & & \vdots \\ 0 & 0 & 0 & \cdots & 1 \end{bmatrix}$$

Figure 3

$$\begin{bmatrix} 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix} \begin{bmatrix} i_0 \\ i_1 \\ \vdots \\ i_{n-1} \end{bmatrix} = \begin{bmatrix} c_0 \\ c_1 \\ \vdots \\ c_{m-1} \end{bmatrix}$$

Figure 4

$$\begin{bmatrix} 1 & 0 & 0 & \cdots & 0 \\ 0 & 1 & 0 & \cdots & 0 \\ \vdots & \vdots & \vdots & & \vdots \\ 0 & 0 & 0 & \cdots & 1 \\ 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix} \begin{bmatrix} i_0 \\ i_1 \\ \vdots \\ i_{n-1} \end{bmatrix} = \begin{bmatrix} i_0 \\ i_1 \\ \vdots \\ i_{n-1} \\ c_0 \\ c_1 \\ \vdots \\ c_{m-1} \end{bmatrix}$$

Figure 5

| i | 0 | 1 | 2 | 3 | 4 | 5 | 6 | 7 | 8 | 9 | 10 | 11 | 12 | 13 | 14 | 15 | 16 | 17 | 18 | 19 | 20 | – |
|---|---|---|---|---|---|---|---|---|---|---|----|----|----|----|----|----|----|----|----|----|----|---|
| GFLog | – | 0 | 1 | 25 | 2 | 50 | 26 | 198 | 3 | 223 | 51 | 238 | 27 | 104 | 199 | 75 | 4 | 100 | 224 | 14 | 52 | – |
| GFILog | 1 | 2 | 4 | 8 | 16 | 32 | 64 | 128 | 29 | 58 | 116 | 232 | 205 | 135 | 19 | 38 | 76 | 152 | 45 | 90 | 180 | – |

Figure 6

```
                1001
        header
        {
                source_path="<path_string>";
                VFS_path="<path_string>";
                source_size=<large_unsigned_integer>;
                push_date=<week_day> <month> <day_num> <hh:mm:ss>;
                total_peer_count=<unsigned_integer>;
                min_peer_count=<unsigned_integer>;
                RPE_metric=RPE_count|RPE_percent;
                RPE_value=<unsigned_integer>;
                replication_count=<unsigned_integer>;
                replication_pc=<unsigned_integer>;
                encryption=<boolean>;
                CW_count=<unsigned_integer>;
                CW_segment_size=<unsigned_integer>;
                last_stripe_size=<unsigned_integer>;
        }

1002
        replication 0
        {
                peer_descriptors={
                        <host_string>(peer_number=<unsigned_integer>,
                last_verification_date=<week_day> <month> <day_num> <hh:mm:ss>;
                heal_count=<unsigned_integer>;
                healed_peers={[<host_string>="<path_string>"]*};
        } host_string = host_name|inet_address
        path_string = {//<host_string>}{/<device_string>}{/<dir_string>}*/
        {<file_string>}
        week_day = Mon|Tue|Wed|Thu|Fri|Sat|Sun
        month = Jan|Feb|Mar|Apr|May|Jun|Jul|Aug|Sep|Oct|Nov|Dec
        hh = 00..24
        mm = 00..59
        ss = 00..59
        segment_id = unsigned_integer
        large_unsigned_integer = 0..2^64
        unsigned_integer = 0..2^32
        boolean = false|true
```

Figure 10A

| Reserved Word | Usage |
| --- | --- |
| source path | The original source path of the content |
| VFS_path | The VFS relative file path of the content |
| source size | The original size of the content |
| push date | The date the content was staged |
| total peer count | The total count of storage hosts involved |
| min peer count | The minimum number of storage hosts per cluster |
| RPE_metric | The recoverable error metric (storage cluster percentage or absolute host count) |
| RPE value | The recoverable error value (e.g. 10 % or 10 hosts) |
| replication count | The count of storage host cluster replications |
| replication pc | The count of storage hosts per replication |
| encryption | A Boolean flag indicating whether the content was encrypted prior to encoding |
| CW count | The count of whole codewords |
| CW segment size | The size of each codeword segment |
| last stripe size | The size, in symbols of the last (uneven) code word |

| Construct Reserved Word | Usage |
| --- | --- |
| peer descriptors | A list of peer descriptors |
| last verification date | The last date the HMF was verified |
| heal count | How many times the HMF was healed |
| healed peers | A list of storage hosts that were healed |

| Construct Reserved Word | Usage |
| --- | --- |
| peer_number | The logical number of the storage host in the cluster sequence |

Figure 10B

```
          1006
         /
header
{
        source_path="//host1/D:/users/temp/movie.mpg";
        VFS_path="/users/temp/movie.mpg";
        source_size=549342572;
        push_date=Tue Oct 29 21:36:05 2002;
        total_peer_count=5;
        min_peer_count=5;
        RPE_metric=RPE_count;
        RPE_Value=2;
        replication_count=0;
        replication_pc=5;
        encryption=false;
        CW_count=179523;
        CW_segment_size=51;
        last_stripe_size=50;
}
              1007
             /
replication 0
{
        peer_descriptors=(host2(peer_number=0),host3(peer_number=1),host4(p
eer_number=2),host5(peer_number=3),host6(peer_number=4),0);
        last_verification_date=Tue Oct 29 21:36:05 2002;
        heal_count=0;
        healed_peers=();
}
```

Figure 10C

|       | CW 0 | CW 1 | CW 2 | CW 3 | CW 4 | CW 5 | CW 6 |
|-------|------|------|------|------|------|------|------|
| Peer 0 | E | 0 | E | E | E | 0 | 0 |
| Peer 1 | E | 1 | E | 0 | 0 | E | 1 |
| Peer 2 | E | 2 | 0 | 1 | 1 | E | 2 |
| Peer 3 | 0 | E | 1 | E | 2 | E | 3 |
| Peer 4 | 1 | E | 2 | E | 3 | 1 | E |
| Peer 5 | 2 | E | 3 | 2 | E | 2 | E |
| Peer 6 | 3 | 3 | E | 3 | E | 3 | E |

Figure 11A

|  | CW 0 | CW 1 | CW 2 | CW 3 | CW 4 | CW 5 | CW 6 | CW 7 | CW 8 | CW 9 | CW 10 | CW 11 |
|---|---|---|---|---|---|---|---|---|---|---|---|---|
| Peer 0  | E | 0 | E | 0 | E | 0 | 0 | E | 0 | E | 0 | 0 |
| Peer 1  | E | 1 | E | 1 | 0 | E | 1 | E | 1 | E | 1 | 1 |
| Peer 2  | E | 2 | E | 2 | 1 | E | 2 | E | 2 | 0 | E | 2 |
| Peer 3  | E | 3 | 0 | E | 2 | E | 3 | E | 3 | 1 | E | 3 |
| Peer 4  | E | 4 | 1 | E | 3 | E | 4 | 0 | E | 2 | E | 4 |
| Peer 5  | 0 | E | 2 | E | 4 | 1 | 5 | 1 | E | 3 | E | 5 |
| Peer 6  | 1 | E | 3 | 3 | 5 | 2 | E | 2 | E | 4 | 2 | 6 |
| Peer 7  | 2 | E | 4 | 4 | E | 3 | E | 3 | E | 5 | 3 | E |
| Peer 8  | 3 | E | 5 | 5 | E | 4 | E | 4 | 4 | 6 | 4 | E |
| Peer 9  | 4 | E | 6 | 6 | E | 5 | E | 5 | 5 | E | 5 | E |
| Peer 10 | 5 | 5 | E | E | E | 6 | E | 6 | 6 | E | 6 | E |
| Peer 11 | 6 | 6 | E | E | E | E | E | E | E | E | E | E |

Figure 11B

|     | Peer 0 | Peer 1 | Peer 2 | Peer 3 | Peer 4 | Peer 5 | Peer 6 | Peer 7 | Peer 8 | Peer 9 | Peer 10 | Peer 11 |
| --- | --- | --- | --- | --- | --- | --- | --- | --- | --- | --- | --- | --- |
| CW0  | E | E | E | E | E | 0 | 1 | 2 | 3 | 4 | 5 | 6 |
| CW1  | 0 | 1 | 2 | 3 | 4 | E | E | E | E | E | E | E |
| CW2  | E | E | E | 0 | 1 | 2 | 3 | 4 | 5 | 6 | E | E |
| CW3  | 0 | 1 | 2 | E | E | E | E | E | 3 | 4 | 5 | 6 |
| CW4  | E | 0 | 1 | 2 | 3 | 4 | 5 | 6 | E | E | E | E |
| CW5  | 0 | E | E | E | E | E | 1 | 2 | 3 | 4 | 5 | 6 |
| CW6  | 0 | 1 | 2 | 3 | 4 | 5 | E | E | E | E | E | 6 |
| CW7  | E | E | E | E | E | 1 | 2 | 3 | 4 | 5 | 6 | E |
| CW8  | 0 | 1 | 2 | 3 | E | E | E | E | E | E | 5 | 6 |
| CW9  | E | E | 0 | 1 | 2 | 3 | 4 | 5 | 6 | E | E | E |
| CW10 | 0 | 1 | E | E | E | E | E | 2 | 3 | 4 | 5 | 6 |
| CW11 | 0 | 1 | 2 | 3 | 4 | 5 | 6 | E | E | E | E | E |

Figure 11C

PEER TO PEER CODE GENERATOR AND DECODER FOR DIGITAL SYSTEMS

CROSS-REFERENCE TO RELATED APPLICATIONS

This application is a continuation of U.S. patent application Ser. No. 10/763,008 filed 21 Jan. 2004, which claims priority under 35 U.S.C. §1.119(e) to U.S. Application Ser. No. 60/441,822, filed Jan. 21, 2003, all of which are herein incorporated by reference.

BACKGROUND OF THE INVENTION

1. Field of Invention

The present invention relates to encoding and decoding digital content for reliable distribution and storage within a networked cluster of storage systems and more particularly to a system that evenly distributes the resource requirements across the cluster of storage systems.

2. Description of Related Art

Network Protocols:

Communication between systems across the Internet is generally accomplished through the Internet Protocol (IP). This transmission protocol supports two higher-level protocols: The transfer Control Protocol (TCP/IP) is a streaming point-to-point protocol and the User Datagram Protocol (UDP/IP) is a connectionless protocol.

TCP/IP has been compared to a telephone conversation where the two parties are connected via a dedicated circuit, with the correctness of the data transmitted being guaranteed by the protocol. In TCP/IP, data is transmitted and received as a stream and, while the sequence of bytes is preserved, it is not guaranteed to arrive all at once, as there are no protocol defined packet boundaries. TCP/IP requires one dedicated socket at each end for the duration of the connection. Thus, data to be transmitted to multiple recipients requires multiple socket connections at the source. This can be a limitation as most operating systems have a finite pool of sockets. Once the pool is exhausted, no new connections can be made until some connections are terminated and their sockets are released back into the pool. Further, data to be transmitted to multiple recipients requires retransmission for each additional recipient thereby using more network bandwidth.

UDP/IP is a packet-oriented protocol that has been compared to sending letters via the post office with the correctness of the data being the responsibility of the application and not the UDP/IP protocol. There is very little management of UDP/IP packets, so they can arrive in the wrong order, they can be duplicated, or not arrive at all. Packet loss in UDP/IP could be due to network congestion, operating system socket buffer overflow, etc. In UPD/IP individual packets arrive complete as the protocol does define packet boundaries. UDP/IP does not require a dedicated socket per connection, as the protocol does not manage the state of the transmission. Instead, one socket can be used to send packets to any number of hosts with each datagram specifying a different network address. UDP/IP is generally faster than TCP/IP but it lays upon the application the responsibility for error detection and recovery, as there is no inherent acknowledge and retransmit capability.

UDP/IP defines three ways of transmitting packets: unicast, multicast and broadcast. Unicast transmits datagrams (packets) for delivery to a single recipient. Multicast transmits datagrams for delivery to a well-defined group of recipients. Broadcast transmits datagrams for delivery to every potential recipient on the network. The usage of broadcast is limited due to the heavy load it places on the network.

Transmission Errors:

Anytime data is transferred across a medium from its source to its destination there is the possibility that errors will be introduced causing packet loss. The errors can be introduced at many steps during the transmission. Some errors are due to physical conditions (such as weather, interference, etc.) affecting the transmission medium such as satellite, antenna, etc. Other errors are due to software/hardware conditions (such as network congestion, buffer overflow, CPU busy, etc.) affecting the source and destination systems' ability to send/receive data packets.

Error Detection and Correction:

Transmission failures fall into two categories: "errors" occur when the data received is corrupted and "erasures" occur when the data is not received. The TCP/IP and UDP/IP protocols ensure that the destination system will not receive corrupted data. However, erasures can occur when packets are entirely missed such as when they are not received within an application-defined period of time. This can easily occur in UDP/IP due to network congestion, and it can happen in both UDP/IP and TCP/IP when the source system dies. There are two methods for correcting the errors, Backward Error Correction (BEC) and Forward Error Correction (FEC). BEC is when the destination system detects that an error has occurred in a packet (e.g., through a single checksum, etc.) and requests that the source system retransmit that packet. The implementation is relatively simple, but the performance is poor as the same packet could be re-transmitted many times due to errors. Additionally, the overhead of the protocol requesting a re-transmission upon error detection and otherwise sending an acknowledgement for each packet is great. Standard FEC coding improves the reliability of transmission by introducing checksum symbols into the data prior to transmission. These checksum symbols enable the receiving system to detect and correct transmission errors, when the error count is within the encoding parameters, without requesting the retransmission of the original data.

Forward Error Correction (FEC):

One of the criteria by which a FEC coding method is gauged is the number of failures/erasures that it can tolerate. There exist many FEC codes whose implementations are of varying complexity depending upon the flexibility and performance required. High performance parity-based coding methods (e.g., Hamming, etc.) usually compute the checksum symbols using the bitwise exclusive-or (XOR) of the data. These are inadequate, as they can tolerate no more than two errors at a time in some error combinations. A system is needed that can tolerate the number of systems failing simultaneously within a cluster to be greater than two. Such coding methods (e.g., generic Reed-Solomon, etc.) often have poor performance when used to encode/decode large data sets that makes them inapplicable to most real-world problems. Another consideration is whether the coding method allows the sequential decoding of the data. Sequential decoding retrieves the data in the order in which it appeared in the original content before encoding. Streaming of audio/video content is not possible without the ability to decode sequentially as the entire data context would have to be decoded before streaming could commence. This is impractical, as it requires that the decoded content be stored locally, which may exceed the system's storage capacity and/or violate the content's copyright/licensing, as well as entail a long delay while the decoding is proceeding before the streaming can begin. For content that does not have a sequential nature (e.g., databases, etc.), a coding method that allows random access into the encoded representation is necessary. The requirement is to encode/decode a specific area of the data set without first encoding/decoding from the start down to the specific area. Performance is an issue for those encoding methods that have this capability while other encoding methods lack this capability altogether.

Storage Medium:

The vast majority of on-line content is stored on hard disk drives (HDD). Near-line content, though mostly stored on tape, is migrating to HDD as the cost of the latter continues to come down and their capacity expands. Off-line content is usually stored on tape. Some storage mediums have inherent limitations that preclude some functionality (e.g., linear tape requires sequential access, volatile memory is not capable or retaining data, etc.) Other storage mediums have no such limitations and allow the application of the full functionality of this invention (e.g., HDD's, Flash memory, etc.)

HDD's are most interesting at the present because the growth in their capacity has far outpaced their ability to store and retrieve data. This asymmetry is such that entirely reading or writing a one-terabyte HDD's would require many days.

Another limitation of HDD's is their reliability. No matter what their Mean Time Between Failure (MTBF), HDD's can fail thereby losing their contents. In order to improve their reliability, HDD's are sometimes grouped into a Redundant Array of Independent Disks (RAID) configuration so that the loss of a single member of the disk group will not interrupt the operations of the RAID. When the defective disk is replaced with a new (empty) disk, the RAID will "rebuild" the data that belongs on the new disk. This is an operation that can take several hours depending upon the size of the disk and the how busy the RAID is. Starting from the time the disk failure was first detected and until the time the replacement disk is "rebuilt", the RAID is said to be "naked." The term naked indicates that the RAID no longer offers any protection, as the loss of a second member of the disk group is fatal to the RAID since it is incapable of correcting more than one failure.

Virtual File System:

A Virtual File System (VFS) provides a unified view of multiple networked file systems. Conventional VFS technology is essentially a networked file system in that only the real file systems know and manage their contents. A VFS is not a real file system as it relies on real file systems to manage the files on their local disks (thus, the "virtual" aspect). Therefore accessing a file through a VFS amounts to forwarding file I/O commands (e.g., open, close, read, write, etc.) via the network to a remote file system. One advantage of a VFS is that it can provide a common layer over heterogeneous file systems. The main benefit is the translation of file path syntax between the different file systems. Thus, an application running under one file system can access files on a remote file system through a seemingly native file path.

One of the limitations of current VFS technology is that it can only represent files that are entirely contained within a single file system.

Scalability:

The amount of data to store is growing at a tremendous rate with no indications of tapering any time soon. This has resulted in ever-greater capacity and performance requirements for storage servers. The latter have grown to manage terabytes of data, which has exacerbated the I/O throughput problems. Storage Area Networks (SAN) were created to provide high performance Fibre networks connecting servers and large RAID's. SAN's are highly complex and very expensive.

Redundancy:

Powerful servers service many simultaneous data transfers and therefore would have a severe impact when they become unavailable. A failure in a non-redundant server will cause immediate disruptions. Redundancy is often added to servers to minimize down time by avoiding single points of failure. Server sub-systemscan be made redundant by duplicating their major components, including the hard disk drives (RAID), the host bus adapters (HBA), RAID controllers, CPUs, network interfaces, memory, routers, switchers, power supplies, etc. SAN's have the same reliability requirements so they are made redundant which requires cross strapping of all the connecting cables from all the servers, RAID's, SAN's, etc. For all this added hardware, most servers and SAN's provide only protection for a single point of failure, as a second failure within the same sub-system will usually cause disruptions. Most fully redundant systems still cause disruptions when their failed components are repaired (e.g., a memory bank, CPU or I/O controller are replaced). The failed components must be repaired as soon as possible because their unavailability increases the vulnerability of the systems. Thus, fully redundant systems do not eliminate disruptions on failures, they simply afford some time to schedule the disruption. Embodiments of the present invention are inherently able to withstand multiple concurrent failures as well as having repairs performed while operational without disruptions.

Server Failure:

When a storage server or RAID fails, its content becomes unavailable and all of its sessions (data transfers) are aborted. At best a replacement becomes available and the clients re-issue their requests so that the sessions restart. This does not result in the resumption of the sessions at the point of interruption; the sessions have lost their previous context. In some cases, the massive spike of activity due to the hundreds of re-issued requests can by itself overwhelm the new server. Some requestors will not re-issue the request and incomplete content may remain on their systems. It is hoped that the new server has access to the same data as the server that failed without which the new requests will fail. As a rule, the error recovery process is more complex than the transfer process for both the clients and the servers. Typically, a backup/stand-by server detects a server failure and a fail-over procedure is initiated culminating in the backup server taking over. The new server has no knowledge of on-going transactions that were aborted as no context is retained during the fail-over procedure. The client systems must recover from the failure and attempt to reconnect to the new server when it completes its take-over for the failed server. It is the burden of the client to keep state and cleanup any interrupted transactions. Long database transactions may be impossible to roll back and the clients may no longer have the data to restart the transactions. The solution is usually to restart the client and requires operator intervention. A very large industry has developed to provide software solutions as workarounds. These are very complex and expensive, yet cannot avoid disruptions either when the failure occurs or when the repair occurs.

Load Balancing:

Load balancing is a major problem for enterprise data centers. Load balancing encompasses all of the resources of a server including the CPU(s), the memory, the storage capacity, the storage I/O bandwidth, the network bandwidth, etc. The availability of large RAID Storage Systems and powerful servers is not sufficient to ensure load balancing. The location of the most requested data determines which servers and their network segments bear the greatest load. Thus, a data center could have several RAID Storage Systems of identical capacity with very different loads based upon usage patterns. Typically adjusting the load is a complex endeavor require service disruption due to the need to move data, take RAID systems off-line in order to re-stripe them, etc.

BRIEF SUMMARY OF THE INVENTION

Described embodiments of the present invention provide a reliable, distributed, efficient and highly scaleable method and system for storing content onto a cluster of Storage Systems that store segments of encoded stripes of the content. Content can be retrieved from the cluster of Storage Systems by reassembling the encoded stripes and if necessary decoding them into original content. Through decoding, the reassembly is successful even if some Storage Systems in the cluster are unavailable or transmission errors occur causing data loss. The high availability of the content is ensured as the system can be configured to recover from the loss of a high percentage of cluster members.

In one embodiment of the present invention, the content (file or stream) is divided into blocks of input symbols and encoded using a derivative of the Reed-Solomon coding method to produce checksum symbols used to recover from multiple erasures. The combination of an input symbol block and its computed checksum symbols forms a codeword. A codeword preferably is divided into equal size segments that are each stored on their respective Storage System.

The Reed-Solomon encoding process is usually very time consuming, especially when the data set is large and the FEC criteria are high. At forty percent FEC, error-based Reed-Solomon algorithms usually achieve a performance of a few thousand bytes per second and the erasure-based algorithms usually achieve less than four megabytes per second. This lack of performance has rendered them inappropriate for most software applications. The novel implementation of the encoder and decoder of embodiments of the present invention achieve very high performance. At forty percent FEC, the present system exceeds seventy megabytes per second. One advantage of embodiments of the present invention is that the encoding computation of checksum symbols has been greatly simplified over standard Reed-Solomon encoding. For a given codeword, a checksum symbol generated through a standard Reed-Solomon algorithm can be used to recompute any missing input symbol. The overhead of computation is tremendous to achieve such flexibility. Furthermore, this flexibility is not necessary for erasures-only implementations. As a direct result of the simplified encoding, the decoding has also become simpler and therefore faster as well. Another advantage of embodiments of the present invention is that the size of the codewords is not limited by the size of the domain of symbols of the implementation. A typical 8-bit symbol Reed-Solomon implementation has a total symbol domain size of 255 symbols ($2^8-1$) and therefore has a maximum codeword size of 255 symbols. The inefficiencies of dividing a large data set (many gigabytes) in sub-256 byte segments (to allow for checksum symbols in the codeword) include starting/stopping encoding very often (which results in many function calls) and greater network overhead as many more packets of a smaller size must be transmitted. Another advantage of embodiments of the present invention is that the encoding and decoding computation is distributed equally to all the Storage Systems within the cluster instead of being performed only by the Storage System initiating the staging of the content. The resulting performance improvements reduce the time required to encode a one-gigabyte file onto a cluster of five PCs from two hours with an ordinary implementation of an encoder to less than five seconds with embodiments of the present invention. The performance continues to improve as the Storage System cluster grows so that a twenty PC cluster requires one second, etc. Another advantage of embodiments of the present invention is that the performance gains grow in essence linearly with the size of the Storage System cluster with the only limit being the network bandwidth and the aggregate I/O throughput of the Storage Systems. The addition of Storage Systems to the cluster introduces no additional overhead.

One advantage of embodiments of the present invention is that the cluster of Storage Systems is self-healing. The system will periodically ascertain the state of the cluster by querying its members to verify that each Storage System is operational and is storing the data as expected. The data lost due to the unavailability of any members of the cluster can be reconstructed on replacement Storage Systems. Healing can occur while a file is being read as well as written. There are no disruptions as the availability of the data is uninterrupted during the healing process. The impact on performance of healing a file is negligible as the amount of computation required is minimal. Consider a gigabyte file stored on a cluster of ten Storage Systems with one failed cluster member. As the gigabyte file is striped equally, the replacement Storage System must recover the one tenth of file that was stored on the failed system (a hundred megabytes). In embodiments of the present invention, all members of the cluster including the replacement Storage System have equal opportunity to participate in the heal transaction. Thus, the hundred megabytes is divided into the ten Storage System cluster with each member computing ten megabytes concurrently. Each member of the cluster is computing one hundredth of the original file size). At a rate of seventy megabytes per second, the missing hundred megabytes are computed in less than one second.

Another aspect of this invention is the added data security it offers. The ability to re-assemble and decode the content from a cluster requires access to a Host Map File (HMF) data that is created as part of the encoding process and stored as the header of every stripe file in the cluster. By optionally encrypting the HMF data and also storing it in a separate file we can ensure that no Storage System is aware of the other members of the cluster or of its own sequence, of the name/location of the original content, of the encoding parameters, etc. Content that has been encoded (Reed-Solomon), scrambled (rotation of the input and checksum symbol segments), and distributed (within a cluster of Storage Systems) is very difficult to recover without the corresponding HMF data. Conventional encryption of a file preserves the contiguity of the data and relies on the keys to safeguard it. In embodiments of the present invention, the files on a Storage System do not represent contiguous data, but interlaced segments of data that, except for one Storage System, do not start at the beginning of the original content. Content thus, encoded would be highly secure, readily available for retrieval or streaming, yet never be stored on a single computer. The file content can also be encrypted before or after being encoded for added security.

The balancing of the I/O and capacity load is another advantage of embodiments of the present invention. In an enterprise data center, embodiments of the present invention allow immediate deployment and integration of new Storage Systems. Embodiments of the present invention consider the Storage Systems as modular building blocks that are tapped as needed to dynamically assemble storage clusters. There no longer is a need to strategize on where to store the data in order to minimize single points of failure and balance the load. In this heterogeneous environment, the main criteria in dynamically enlisting a Storage System into a cluster for purposes of storing content are its availability, its storage capacity and its present load (e.g., processor, memory, network, etc.). Specifically, a Storage System's hardware architecture and operating system are not considerations as they are not material to the storing of data. Embodiments of the present invention automatically distribute the entire load evenly across the cluster including I/O (disk and network), CPU (encoding and decoding) and storage capacity.

BRIEF DESCRIPTION OF THE SEVERAL VIEWS OF THE DRAWING

FIG. 2 depicts an m×n Vandermonde matrix.

FIG. 3 depicts an n×n identity matrix.

FIG. 4 depicts the encoder multiplication of the Vandermonde matrix with one packet of input symbols (data).

FIG. 5 depicts the n+m×n maximal decoder matrix before the elimination of erasure rows and inversion.

FIG. 6 depicts the first few entries in the logarithm and inverse logarithm tables of the Galois field $GF(2^8)$.

FIG. 10A depicts the grammar of the Host Map File.

FIG. 10B depicts a tabular description of the constructs in a Host Map File.

FIG. 10C depicts a sample Host Map File.

FIG. 11A depicts a seven-segment Rotational Distribution Look Up Table sorted by peers (Storage Systems).

FIG. 11B depicts a twelve-segment Rotational Distribution Look Up Table (RLUT) sorted by peers (Storage Systems).

FIG. 11C depicts the RLUT of FIG. 11B sorted by codewords.

DETAILED DESCRIPTION OF THE INVENTION

General Discussion

Figure 1A:
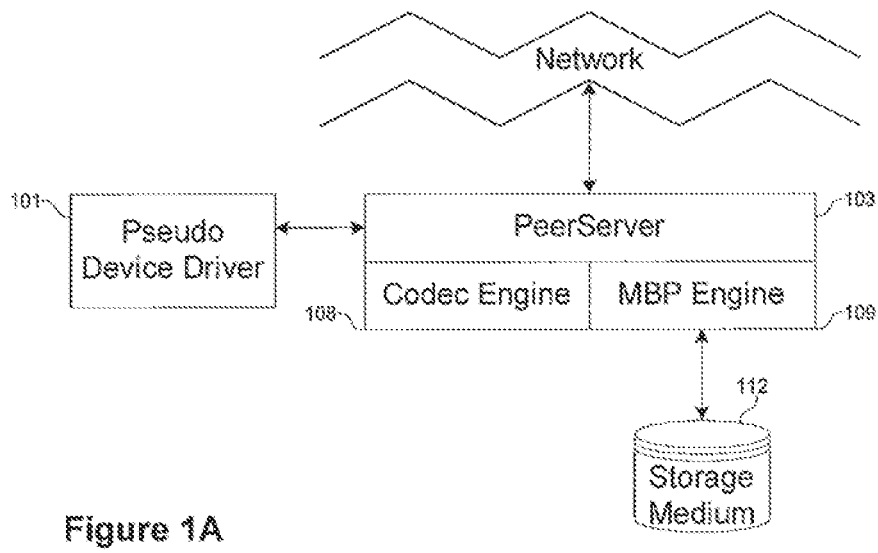
FIG. 1A depicts a block diagram of the major components of a Storage System including a PeerServer, a Pseudo Device Driver, a Codec Engine, an MBP Engine and a local storage medium.

A Generic Reed-Solomon Encoder Implementation:

A Reed-Solomon encoder takes input symbols and computes the corresponding checksum symbols in order to produce a codeword that can correct transmission errors. The width of the symbols is variable, though as it grows the universe of symbols, defined as $2^w$ where w is the width of the symbols in bits, becomes rapidly unmanageable for most computers. At w=8, the universe of symbols is $2^8$=256 (8-bit) bytes which is quite manageable. At w=16, the universe of symbols is $2^{16}$=65536 (16-bit) words which is manageable from the memory aspect, but time-consuming from the computational aspect. At w=32, the universe of symbols is $2^{32}$=4294967296 (32-bit) words which exceeds the memory and computational capacity of most computers. Due to current performance limitations of computers, the width of the symbols is usually set at w=8. The input and checksum symbols are combined to form a resilient block of symbols called a codeword.

The Reed-Solomon codes are defined as:

$RS(n,k)$

Where n is the total number of symbols per codeword and k is the number of input symbols per codeword. The number of checksum symbols r is defined as:

$r=(n-k)$

The maximum number of symbols with errors that can be corrected is:

$t=r/2$

Redundancy is the ratio of checksum symbols to input symbols. Increasing the redundancy increases the reliability, but also the storage space occupied and the time required to compute the checksum symbols. A full implementation of a Reed-Solomon encoder is one that recovers from failures due to erasures and errors. By definition, an erasure occurs at a known location within the codeword whereas the location an error must be discovered through computation to validate the codeword. To recover from x input symbol errors requires 2x checksum symbols. If the codeword size is 255 bytes and the recoverable input symbols error count is 16, then at least 32 checksum symbols must be generated leaving a payload of at most 223 input symbols in a packet.

A Vandermonde matrix (see FIG. 2) is an m×n matrix defined as:

$v_{i,j}=j^{i-1}$

FIG. 4 depicts encoding using Reed-Solomon codes for the recovery of erasures. The encoding is the multiplication of an m rows by n columns (m×n) Vandermonde matrix V 400 and an n×1 input symbol matrix D 401 resulting in a m×1 checksum symbol matrix C 402, using the following equation:

$VD=C$

These checksum symbols can be used to augment the input symbols during transmission thereby providing the recipient(s) the (FEC) capability to repair erasures in the input symbols by recomputing them using the checksum symbols.

The codeword is represented by the m+n×1 matrix E defined as:

$$E = \begin{bmatrix} D \\ C \end{bmatrix}$$

FIG. 5 depicts the computation of matrix E 502 as:

$$WD=E$$

Where the m+n×n matrix W 500 is defined as:

$$W = \begin{bmatrix} I \\ V \end{bmatrix}$$

The matrix I is the identity matrix as depicted in FIG. 3.

The maximum count M of symbols per codeword CW is $$M=2^w-1$$

For example for w=8, M=255 symbols.

Codewords are divided into as many segments as there are hosts in a cluster so that a cluster of H hosts will result in codewords divided into H segments of size s $$s=M/H$$

Where H is less than or equal to M to ensure that no cluster stores less than one symbol per codeword. Were H allowed to be greater than M, bit manipulation of the symbols in the codewords would be required which would significantly impact performance.

A fundamental requirement of the erasure recovery algorithm is that any checksum symbol can be used to recover any input symbol. In other words, any checksum symbol segment can be used to recover any input symbol segment. This is because it is not possible to predict which input symbols will be erased.

A Generic Reed-Solomon Erasures Decoder Implementation:

The decoding process in order to recover erasures in the input symbols D relies on the equation:

$$D=EW^{-1}$$

Where the $W^{-1}$ matrix is the inverse of the W matrix as computed using arithmetic over Galois fields. Galois field arithmetic is necessary in Reed-Solomon computation as the universe of symbols used is limited to binary words of fixed length. The finite precision of such words renders calculations such as the Gaussian Elimination (used to invert the dispersal matrix) impossible. Galois fields are used to ensure valid results of arithmetic over the universe of symbols. Galois field arithmetic defines addition and subtraction of the elements of the field as the exclusive-or (XOR) operation. Multiplication and division over Galois fields are performed using two logarithm tables as partly depicted in FIG. 6. Multiplication is defined to be the inverse log of the addition of the logs of two numbers expressed as:

$$GFI\,Log(GF\,Log(a)+GF\,Log(b))$$

And division is defined to be the inverse log of the subtraction of the logs of two numbers expressed as:

$$GFI\,Log(GF\,Log(a)-GF\,Log(b))$$

Continuing the decoding process, within matrix $W^{-1}$ the rows corresponding to input symbol erasures are removed from W and E, and any n rows are selected from W and E, thereby producing W' and E' respectively. No more than m rows can be removed, as this is the count of checksum symbols produced. Each erasure value is recomputed by multiplying the corresponding logical row in W' by E'. Any checksum erasures are ignored, as it is only necessary for the decoding process to recompute the input symbol erasures. An error occurs when the erasures count exceeds the checksum count m, as there is insufficient information to repair the erasures detected.

The described embodiments of the present invention are only concerned with erasures, which makes it more efficient. To recover from x input symbol erasures requires x checksum symbols. If the codeword size is 255 bytes and the recoverable input symbols error count is 16, then at least 16 checksum symbols must be generated leaving a payload of at most 239 input symbols in a codeword. Thus, an erasure failure model requires fifty percent less checksum symbols than an error failure model. This increase in the input symbol payload per codeword translates into fewer packets transmitted and less data stored on the staging hosts.

Details of Embodiments

In the descriptions of the embodiments described herein, the FEC coding method used is a derivative of the Reed-Solomon codes. Other coding methods can also be used depending upon their suitability to various embodiments of the present invention. Much literature exists describing Reed-Solomon codes and their use is widespread, ranging from satellite communication to compact disk players, etc. However, their ability to recover from failures due to errors as well as erasures is to a significant degree offset by their poor performance. Embodiments of the present invention achieve substantial improvements in performance through three main components. The first is a high performance algorithm for encoding and decoding. The second is load balancing of all computation and I/O over a cluster of Storage Systems. The third is a high performance communication Multicast Burst Protocol (MBP). The system benefits from several other novel aspects such as essentially limitless scalability, a true Virtual File System, no single point of failure, etc., as described later.

Embodiments of the present invention have one or more clusters of Storage Systems functioning as peers to collaborate in the storage and retrieval of data. The present invention refers to Storage Systems rather than computers and storage mediums rather than hard disk drives, as these are one embodiment but by no means the only one. A Storage System as illustrated in FIG. 1A has three major components: a PeerServer 103, a Codec Engine 108 and an MBP Engine 109. The Pseudo Device Driver 101 may optionally reside on the Storage System, but is not required. The fundamental hardware requirements of a Storage System are: a processor, memory, a network connection and some storage medium. There are many ways to satisfy these requirements. A processor and memory can be available through a server, a single board computer or even a System On a Chip (SOC). Most of these also include network connectivity through either a board, a single chip or embedded within the SOC. The storage medium requirement is for a persistent repository of data.

Many devices satisfy this requirement beside hard disk drives, including flash memory, tape drives, CD-R, etc. Storage technology is evolving rapidly and the various storage mediums are well suited for different embodiments of the present invention.

The cluster has no single point of failure as it has no central control and all the Storage Systems are equal peers. A cluster is assembled dynamically as Storage Systems attempt to discover their peers over the network. No Storage System has inherently more information than its peers have. For example, no Storage System manages the Virtual File System of the cluster as it is assembled through peer-to-peer communication. Thus, when an application process wants to retrieve the contents of a file stored on the cluster, the protocol is to multicast a request to the entire cluster and let the cluster resolve any issues, such as how is the file striped, which peers are supposed to have a stripe, which peers are missing and how to repair any missing stripes.

Embodiments of the present invention maximize the encoding network bandwidth usage through the use of UDP/IP multicasting. All communication packets between Storage Systems that contain codeword segments are multicast across the cluster. The cluster size has therefore no impact on performance as the entire cluster receives a multicast UDP/IP packet whether there are ten Storage Systems in the cluster or whether there are ten thousand Storage Systems in the cluster. Thus, when a file is transmitted to the cluster for storage, it will be transmitted once only regardless of the size of the cluster. For example, a one-gigabyte file striped over a ten Storage System cluster will result in each Storage System receiving the entire file but encoding and storing only one tenth of the file (one hundred megabytes).

Embodiments of the present invention maximize decoding performance by leveraging UDP/IP multicasting to give all Storage Systems an equal opportunity to perform computations. When a codeword is retrieved from a cluster, each available Storage System multicasts its segment of the codeword thus, making it available to the entire cluster. When some Storage Systems are (or become) unavailable, all the available peers are able to aggregate the transmitted codeword segments and therefore have sufficient data to decode the missing segments. Note that, during the retrieval of content, no checksum segments from unavailable Storage Systems are decoded, as these do not contribute to the retrieval of the original content. The actual decoding computation is performed on a rotational pattern based upon a formula or method that includes the available peers and the missing peers. For example, if one of the ten Storage Systems in the previous encoding example were unavailable, the computation of its missing one hundred megabytes would result in each of the nine remaining available Storage Systems computing one ninth of one hundred megabytes.

Embodiments of the present invention maximize the healing performance by leveraging UDP/IP multicast to give all the available Storage Systems, including the empty replacement systems, an equal opportunity to heal the content by computing missing segments. Note that during the healing of content checksum segments from unavailable Storage Systems are recomputed, as these are required for the recovery of the lost Storage Systems. When permanently unavailable members of a cluster are replaced with new Storage Systems, the latter have no content initially. The replacement Storage Systems proceed to heal the cluster by recreating the content that was on the Storage Systems they are replacing. The computation of missing segments is performed by decoding codewords in a manner similar to the retrieval of the content. However, when healing, even the replacement Storage Systems participate in the computation. They are able to aggregate the codeword segments that are multicast by the available Storage Systems in the cluster and participate on an equal basis in the rotational computation pattern. For example, if one of the ten Storage Systems in the previous encoding example was healed, the computation of its missing one hundred megabytes would result in each of the nine remaining available Storage Systems and the replacement Storage System computing one tenth of one hundred megabytes.

The High Performance Algorithm for Encoding:

The High Performance Encoder Implementation (HPEI) is a derivative of the Reed-Solomon algorithm. The HPEI modifies the premise of the Generic Reed-Solomon Encoder Implementation that any checksum symbol within a codeword can be used to recover any input symbol. Such checksum symbols are referred to as Unrestricted Checksum Symbols (UCS) in embodiments of the present invention. The new premise is that any checksum symbol within a codeword can replace any input symbol of the same order. Such checksum symbols are referred to as Restricted Checksum Symbols (RCS) in embodiments of the present invention. Each segment within a codeword is an ordered set of symbols and all segments are of the same size by construction.

In the HPEI, codeword $CW(i, j, k)$ is defined as the ordered set of i segments of j symbols where k segments contain only checksum symbols and $l=i-k$ segments contain only input symbols.

The performance benefits stem from the far lesser computation required for computing these Restricted Checksum Symbols versus Unrestricted Checksum Symbols. RCS are sufficient for error recovery because all Storage Systems store segments of equal size that consist exclusively of checksum symbols or input symbols based upon a codeword rotation. Thus, the recovery from the loss of an input symbol segment (Storage System) is performed using a checksum symbol segment of equal size and therefore containing sufficient symbols in the corresponding order. Any fragmentation of the checksum symbols over the cluster would be inadequate, as there would always be some failure combinations for which no checksum segment could be assembled with symbols in the right order.

Figure 12A:
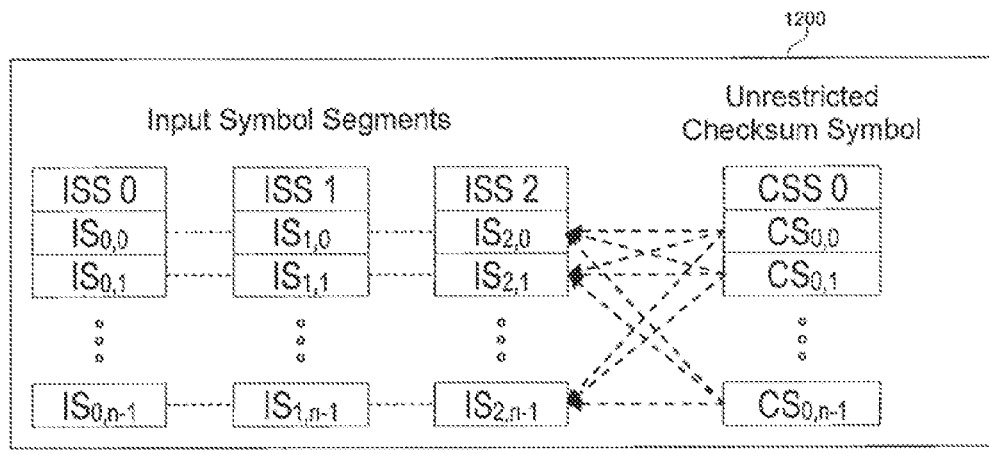
FIG. 12A depicts the potential interactions of unrestricted checksum symbols with the input symbols of a codeword.

To produce an Unrestricted Checksum Symbol, the computation must be applied to all the input symbols in the codeword (see FIG. 12A). To produce a Restricted Checksum Symbol, the computation must be applied to all the input symbols of the same order in the codeword (see FIG. 12B). For example, at 40 percent FEC, a codeword containing 3 segments of 51 input symbols each must generate 2 segments of 51 checksum symbols each. To generate one segment of UCS requires $3*51*51=7803$ operations. To generate one segment of RCS requires only $3*51=153$ operations. This represents a 98 percent decrease in computation.

As part of their enlistment into a cluster, the Storage Systems are assigned a unique sequence number. This number is used in the identification of segments within a codeword for encoding and decoding. For all segments there is a fixed one to one mapping of the segment number and the Storage System number.

In one embodiment of the present invention, to compute a restricted checksum symbol segment CSS, a unique index ix into table GFI Log 602 is computed for each input symbol segment. The index must be unique across all the checksum symbol segments of each codeword. The entries into table GFI Log 602 corresponding to each index are used to encode a checksum symbol segment.

Figure 12B:
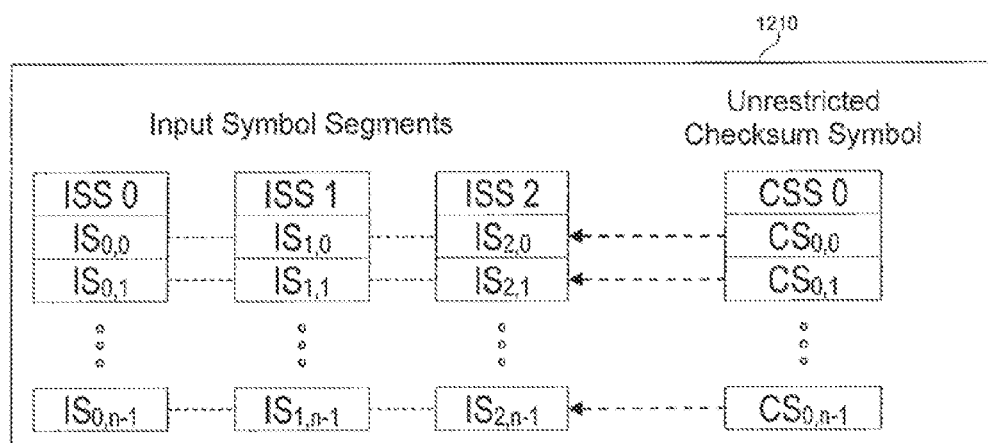
FIG. 12B depicts the potential interactions of restricted checksum symbols with the input symbols of a codeword.

Referring to FIG. 12B, we start by setting every symbol slot in the checksum symbol segment CSS0 to 0. Then a unique value for ix is computed for segment ISS0; each input symbol $IS_{0,x}$ (x=0, ..., n−1) is multiplied over the Galois Field GF by ix; the resulting value is made into the corresponding checksum $CS_{0,x}$ by XORing it with the previous value of $CS_{0,x}$. The process repeats for the remaining input symbol segments ISS1 and ISS2, each with a new value for ix. Thus, a sequence of ix index values is created forming an encoding vector with one element per input symbol segment.

The High Performance Algorithm for Decoding:

The computation associated with decoding to retrieve the original content is necessary only when some input symbol segments of a codeword are unavailable. No decoding is necessary to retrieve the original content of a codeword when no segments are missing, or only checksum symbol segments are missing.

In one embodiment of the present invention, to repair one or more Restricted Input Symbol segments in a codeword CW, a l×l decoding matrix X is produced reflecting the missing input symbol segments. The decoding matrix X is the identity matrix 300 in rows that correspond to input symbols and a decoding vector in rows that correspond to erasures. The decoding vector for an erasure input symbol segment ISSn is constructed as a sequence of unique ix index values into table GFI Log 602 corresponding to each input symbol segment.

Figure 8A:
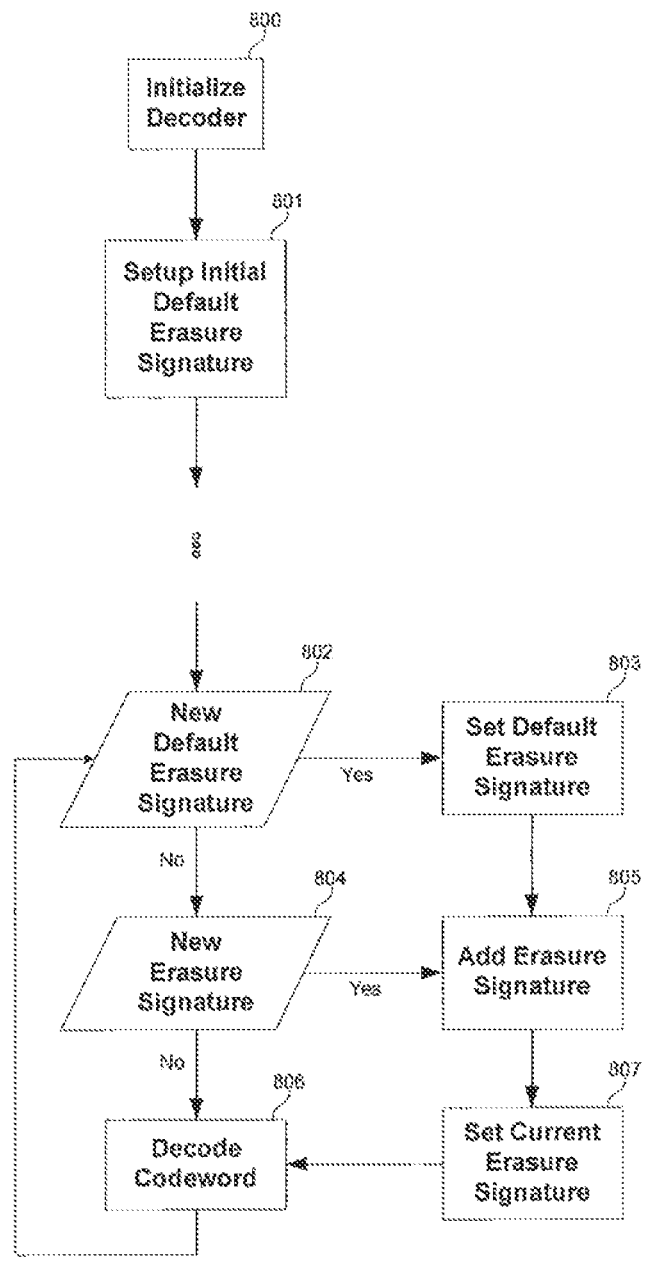
FIG. 8A depicts a flowchart of the management process of the Erasure Signatures of the High Performance Algorithm for Decoding.
Figure 8B:
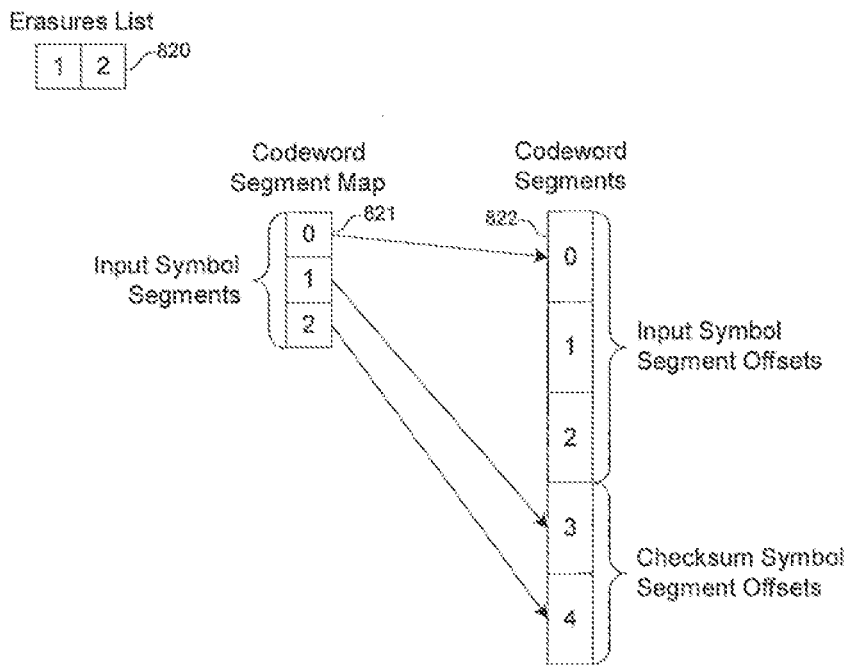
FIG. 8B is a diagram illustrating an example of the construction of a Codeword Segment Map based upon an erasures list.
Figure 8C:
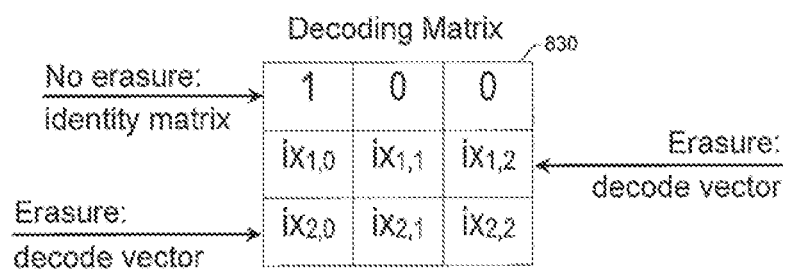
FIG. 8C is a diagram illustrating an example of the Erasure Signature decoding matrix computation.

FIGS. 8B and 8C show an example of the construction of a decoding matrix. In this example, codeword 822 consisting of 3 input symbol segments 821 (0, 1, 2) and 2 checksum symbol segments (3, 4) has incurred erasures described in erasure list 820 of input segments 1 and 2. In FIG. 8C, decoding matrix 830 has the vectors necessary to recompute input symbol segments 1 and 2. Input segment 0 is not an erasure and therefore is represented as its corresponding identity matrix vector. Input segments 1 and 2 are erasures and therefore are represented by two decoding vectors corresponding to checksum symbol segments 3 and 4.

Erasure Signatures:

A time-consuming computation is the construction of the decoding matrix X that corresponds to a given erasure pattern. Specifically the process of inversion of the X matrix is a time-consuming task. This task is especially wasteful when the erasures follow a repetitive pattern such as when some members of the cluster of Storage Systems are congested or otherwise unavailable. Erasures are more likely to occur the larger the cluster as it is difficult to ensure that a cluster consisting of thousands of Storage Systems is always functioning at 100 percent.

An Erasure Signature (ES) is a description of the missing symbol segment pattern for a codeword along with the necessary data structures to repair any codeword with this segment erasure pattern. It is generated if a sufficient combination of input and checksum symbol segments necessary to reconstruct the missing input symbol segments is received. In other words, an ES is only generated when the decoder is able to correct the codewords. An ES includes the list of erasures, a Codeword Segment Map (CSM) and the corresponding l×l decoding matrix X. The list of erasures simply contains the list of segment numbers (Storage Systems) that are erasures. The list is constructed from the list of Storage Systems from which packets were not received. The CSM is an ordered list of available segments in any codeword that matches the missing symbol segment pattern. Each entry in the list has an offset to the start of a symbol segment into the codeword. This list eliminates the need to copy the segments of codewords for contiguity in order to perform the matrix multiplications necessary for decoding.

When an Erasure Signature is created, its decoding matrix is retained so that subsequent use of the ES does not entail the generation of a new decoding matrix. A default ES is created as part of the initial negotiation process with the cluster of Storage Systems that reflects the missing Storage Systems known at the onset.

FIG. 8B shows an example of the computation of a Codeword Segment Map for an ES pattern. In this example, codeword 822 has 3 input symbol segments and 2 checksum symbol segments. Erasures of input segments 1 and 2 were detected as illustrated in erasure list 820. Codeword Segment Map 821 has the offsets to the three segments necessary to reconstruct the three input segments. Input segment 0 is not an erasure and therefore retains it own corresponding offset. Input segments 1 and 2 are erasures and now correspond to checksum symbol segments 4 and 4 respectively.

Erasure Signatures are possible within a cluster as the combination of erasures is limited by the size of the cluster and each erasure (e.g., packet missed from a Storage System) represents a segment of a codeword, not just a single symbol. Additionally, erasures within a cluster are likely to follow patterns. Once a Storage System is down, it is likely to remain down for the duration of the retrieval of the content and its absence is denoted in the default ES. Similarly, when a Storage System is congested for any reason (e.g., its load, its network, etc.) it is likely to remain so over many packets and its absence is denoted in a corresponding ES that is derived from the default ES.

In one embodiment, decoding engine 126 operates as follows and as shown in the flowchart of FIG. 8A with the corresponding steps of FIG. 8A indicated parenthetically in the description of the process. First in the decode initialization (800), Galois table 600 is initialized for the symbol width configured. Upon completion of the initial negotiating process, the system sets up the initial default ES (801). When the system determines that one or more of the Storage Systems in the cluster are unavailable and can no longer participate in the retrieval, it sets a new default ES (803) which adds a new ES (805) and sets it as the current ES (807). When the system receives a new codeword, it determines whether the new codeword's erasures are different from the default ES pattern and if so notifies the decoder of the new pattern (804). The decoder compares the new pattern with the other patterns previously established and if no match was found, creates a new ES (805) and sets it as the current ES (807). When the codeword received matches a known erasure signature, its erasure input symbol segment(s) are decoded (806). The addition of a new ES (805) is a time-consuming process that includes the inversion of the decode matrix X. This step is to be avoided if possible, so retaining old Erasure Signatures for re-use as new ones are created is a key step for decoding efficiency.

Arbitrarily Large Codewords:

A performance advantage of Restricted Checksum Symbols is that the symbol count within a codeword can exceed size of the universe of symbols corresponding to the width of the symbols. When using UCS, the count of symbols per codeword is limited to $2^w-1$ where w is the width of the symbols. Thus, when using 8-bit wide UCS, it is not possible to exceed $2^8-1=255$ symbols per codeword. When using 8-bit wide RCS, there is not limit to the number of symbols per codeword. Large codewords improve performance in two respects. First, the encoding and decoding computation is faster as the overhead of setting up for the computation is diminished in relation to the data size. The setup overhead includes function calls, variable initializations, etc. Rather than setting up for every (small) 255-symbol codeword, the codec can setup for much larger codewords. Second, the disk and network I/O is improved as more data is processed per I/O transaction resulting in less kernel access contention, more efficient usage of the hardware and greater throughput.

The Rotational Load Balancing Implementation:

Embodiments of the present invention maximize the performance of the encoding and decoding computation by evenly distributing the workload throughout the entire cluster using a Rotational Algorithm. The algorithm produces a Rotational Look Up Table (RLUT) that distributes the codec workload evenly across a cycle of codeword encoding/decoding patterns. The algorithm takes as configuration parameters the count of Storage Systems actively participating in the transaction, and the count of checksum segments per codeword. The latter count corresponds to the maximum number of recoverable Storage System failures when storing data or the actual number of failed Storage Systems when retrieving data. When storing data, the RLUT is used by the Storage Systems to determine for a given codeword number whether to encode and store a checksum segment or just store an input symbol segment. When retrieving data, the RLUT is used by the Storage Systems to determine for a given codeword number whether to decode an erasure segment. Each entry in the RLUT marked E indicates a checksum symbol segment. Each checksum symbol segment E is unique as each is computed with a unique index derived from the Storage System's unique identification. Each entry in the table marked with a number indicates a specific input symbol segment.

The algorithm for the construction of the RLUT computes all the codeword patterns in the cycle. Starting with the first Storage System in the first codeword pattern, it assigns as many codec tasks as there are checksum segments. The remaining Storage Systems are assigned input symbol storage tasks through the specific designation of an input symbol segment. The rotation continues until all codeword patterns are described. There is a secondary rotation possible within the individual codeword patterns when checksum segments reach the last Storage System and must wrap to the first Storage System.

To determine how each Storage System will process a given codeword we must first identify the codeword's corresponding RLUT pattern. As codewords are stored (encoded) they are implicitly assigned a unique number that reflects their sequential position from the start of the file. The codeword pattern x corresponding to codeword number y in an RLUT of size z is computed using modulus arithmetic as $x = y \bmod z$ Given a Storage System's unique sequence number n within the cluster and codeword pattern x, we can easily determine the corresponding action t as $t = RLUT(n, x)$ FIG. 11A depicts a sample RLUT (1100) of a cluster consisting of set of seven Storage Systems denoted as rows {peer 0, ..., peer 6} and configured for (up to) three Storage System failures. Four segments per codeword are input segment and three segments are checksum segments. Each entry in the RLUT marked E indicates a checksum symbol segment. Each entry in the table marked with a number indicates a specific input symbol segment.

FIG. 11B depicts a twelve-segment Rotational Distribution Look Up Table sorted by peers (Storage Systems). Seven segments per codeword are input segment and five segments are checksum segments. In this example, each codeword will be divided into seven segments of equal size; four input symbol segments and three checksum symbol segments. The RLUT cycle has a set of seven codeword patterns denoted as columns {CW 0, ..., CW 6}. The RLUT demonstrates that the codec workload is balanced over a complete rotational cycle. As an example of the usage of the RLUT, consider codeword number 500 in an encoding or decoding sequence:

Codeword 500 corresponds to cycle CW 3
Codeword 500 is encoded by Storage Systems peer 2, peer 3 and peer 4
Codeword 500 is stored by Storage Systems peer 0, peer 1, peer 5 and peer 6
Peer 0 is storing codeword 500 segment 0
Peer 1 is storing codeword 500 segment 1
Peer 2 is encoding codeword 500
Peer 3 is encoding codeword 500
Peer 4 is encoding codeword 500
Peer 5 is storing codeword 500 segment 2
Peer 6 is storing codeword 500 segment 3

Support for Sequential and Random Access:

The encoding process distributes the content into a sequence of codewords striped across the cluster of Storage Systems as fixed-size segments. The fixed-size nature of the segments lends itself naturally to sequential access to the content. Specifically, to retrieve some original content that was encoded, it is possible to start at the top of each of the corresponding segment files in a cluster and retrieve one segment from each file and aggregate the segments as per the Storage System sequence in the cluster. This operation can be repeated until all the content is retrieved.

Figure 13:
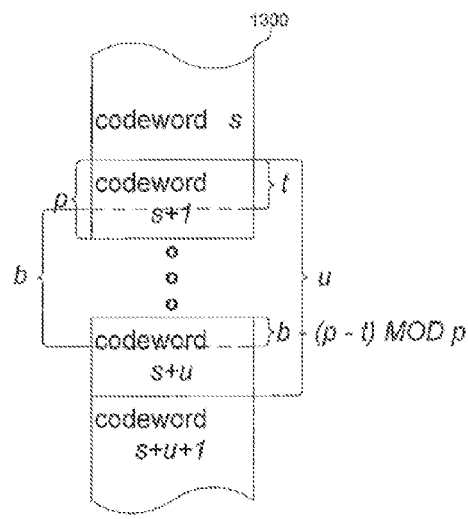
FIG. 13 depicts the major components of random access codeword computation.

Random read and write access into the content is also possible due to the fixed-size nature of the segments. Given a location within the original content and a number of bytes to read or write, it is a simple matter to compute the corresponding codeword number and thereby the location of the codeword's segments (see FIG. 13). The location within the original content is specified as a byte offset o from the start of the content and b is the byte count to read or write. Remember that in the HPEI, codeword CW(i, j, k) is defined as the ordered set of i segments of j symbols where k segments contain only checksum symbols and l=i−k segments contain only input symbols. We define q to be the width of the symbols in bytes. We compute the payload p of a codeword as the number of input symbol bytes available $p = l*q$ We can now compute s as the number of codewords to skip to get to the codeword that contains the start of location o.

$s = o/p$

We can now compute t as the byte offset into the codeword that contains the start of location o.

$t = o \bmod p$

Depending upon the byte count b, a sequence u of one or more codewords may be spanned with the payload of the first codeword only partially spanned towards its end and the payload of the last codeword only partially spanned towards its start. We compute u as $u = (b + p - 1)/p$ The first codeword provides the last p−t bytes of its payload. The last codeword provides the first b−(p−t) MOD p bytes of its payload.

Pseudo Device Driver:

A Pseudo Device Driver (PDD) is the gateway to the cluster of Storage Systems for most applications. The PDD is a real kernel-resident driver that supports all the operating system's driver entry points (e.g., in UNIX/Linux these include open, close, read, write and ioctl). The term pseudo is used to indicate that the device driver does not directly control any hardware. The PDD controls one or more pseudo devices that look to all applications as individual disk drives. Each pseudo device is the logical representation of a cluster of Storage Systems. It is also possible to segment the storage capacity of each cluster member at the partition or physical level. In such cases multiple pseudo devices can correspond to various partitions of a single cluster of Storage Systems.

Figure 1B:
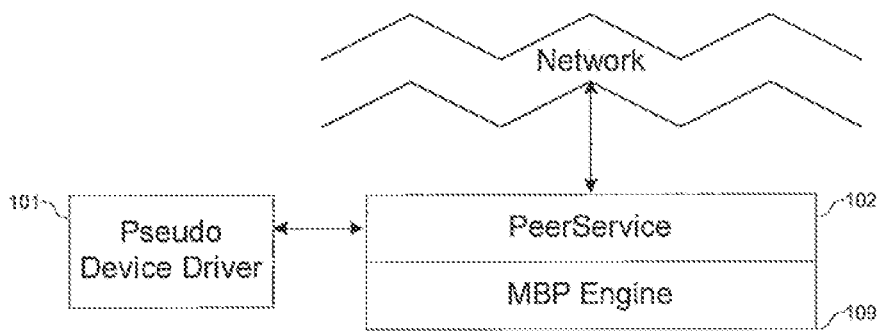
FIG. 1B depicts a block diagram of the major components of a PeerService Process including a PDD and an MBP Engine.
Figure 1C:
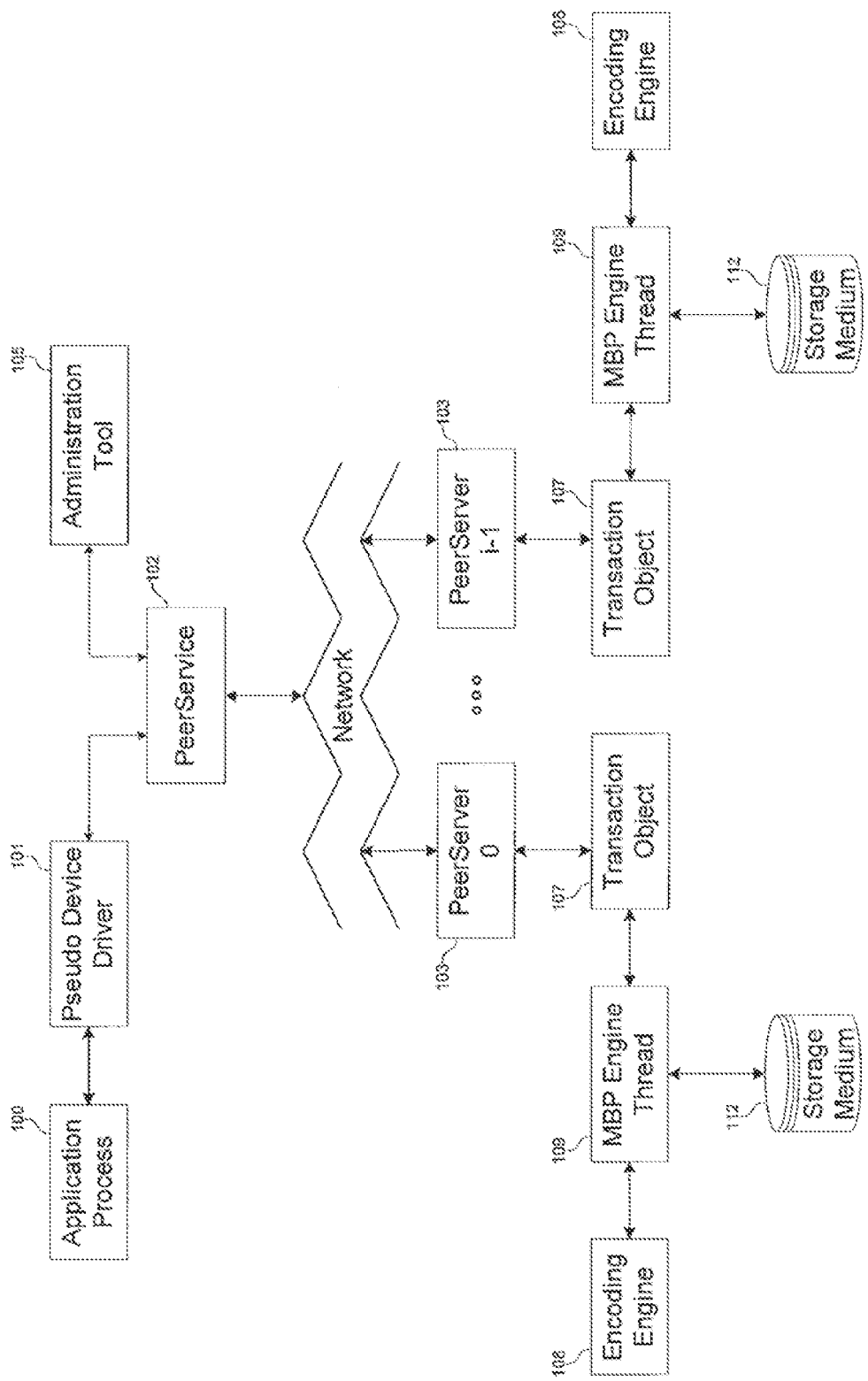
FIG. 1C depicts a block diagram of the content staging system.
Figure 1D:
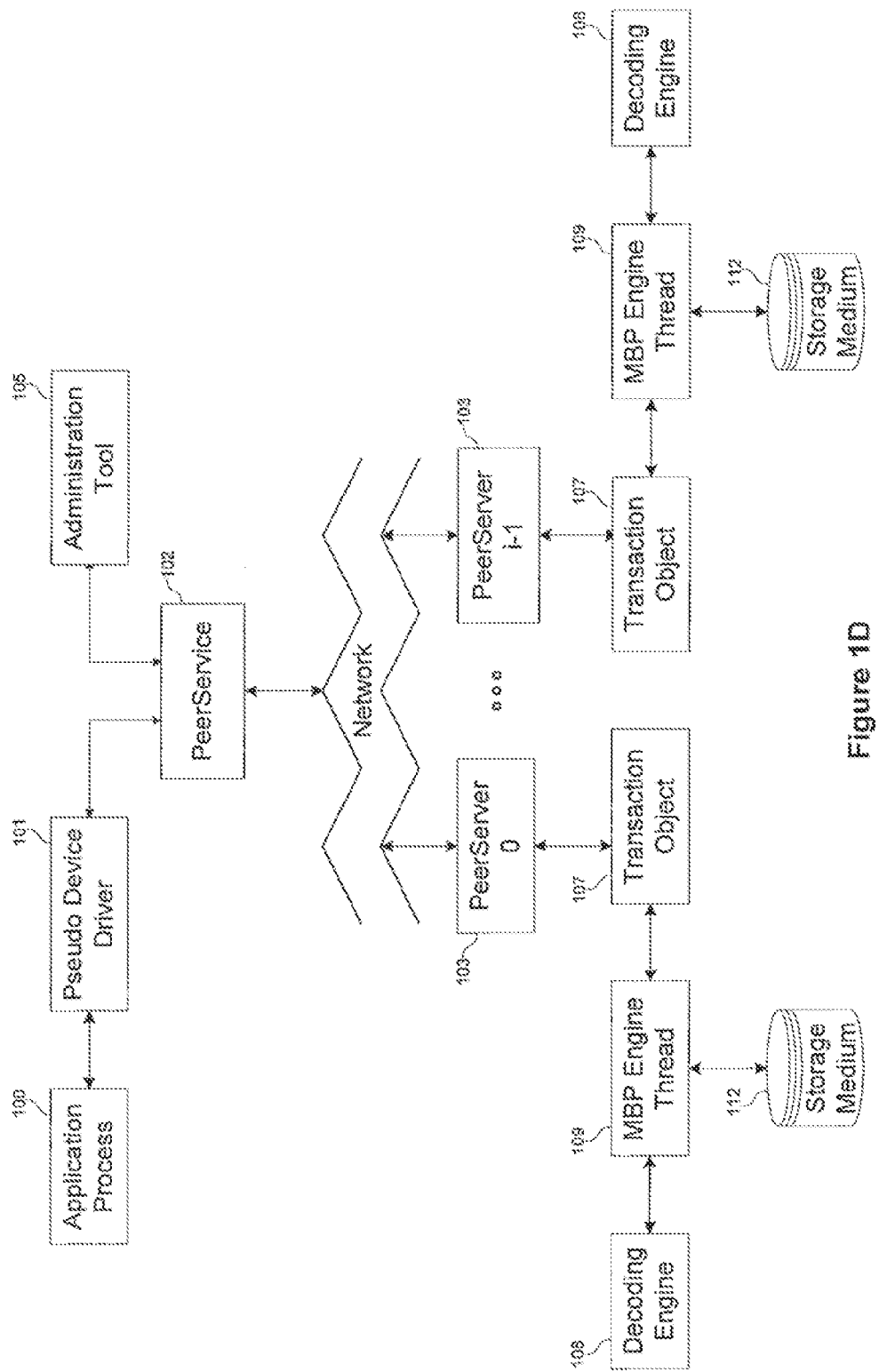
FIG. 1D depicts a block diagram of the content retrieval system.
Figure 14A:
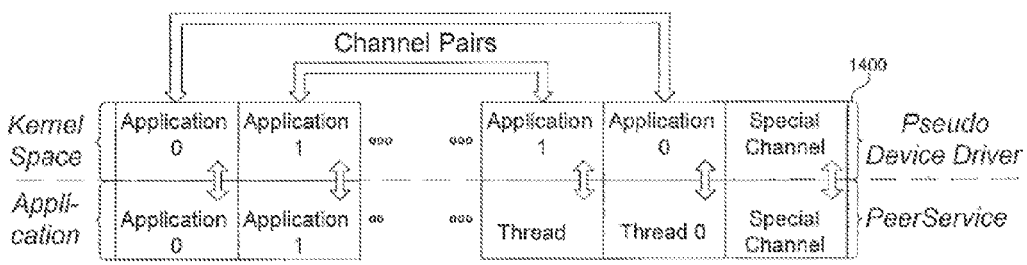
FIG. 14A depicts communication channels of the Pseudo Device Driver with a PeerService Process.
Figure 14B:
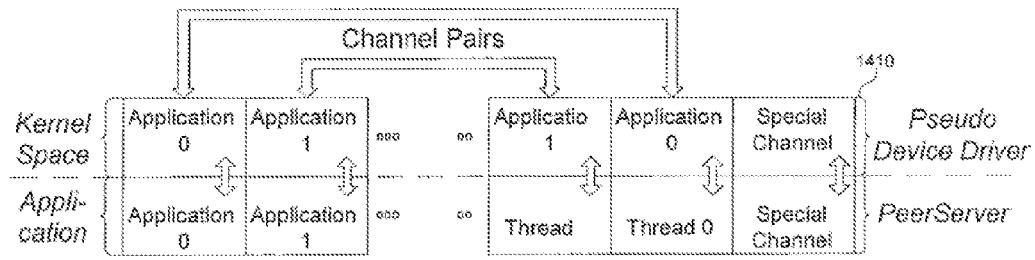
FIG. 14B depicts communication channels of the Pseudo Device Driver with a PeerServer Process.

Communication across a cluster of Storage Systems occurs in UDP/IP. This is a higher-level protocol that is not available to the PDD as it runs in kernel mode. The PeerService server process (see FIG. 1B) is a communication bridge between the PDD and the cluster of Storage Systems. Client applications open connections to the PDD and issue I/O calls which are forwarded by the PDD to the PeerService server process that in turn multicasts them to the cluster of Storage Systems. The sequence of events is as follows (see FIGS. 14A and 14B):

A. The PDD is installed on a computer and its corresponding devices created (e.g., "z:"under Windows and "/dev/pf0" under Unix/Linux).
    B. At boot time the operating system loads the device driver.
    C. Subsequently the various server processes (daemons under Unix/Linux and Services under Windows) including the PeerService are started.
    D. Upon starting the PeerService opens a special channel to the PDD and identifies itself.
    E. Some application opens a file on the PDD for reading, writing or both. This opens a channel to the PPD.
    F. The PDD forwards the request to the PeerService via the special communication channel and passes a unique session identifier.
    G. The PeerService initiates a transaction that negotiates with the cluster to enlist sufficient Storage Systems to support the command.
    H. Upon the successful completion of the negotiations, a new computation thread is created that is dedicated to this application.
    I. The thread opens a new dedicated channel to the PDD for the unique session identifier it received.
    J. Any I/O received by the PDD from either the PeerService or the application is forwarded via their channels without leaving the kernel. The two channels form a channel pair that is managed by the PDD. Thus, data written at either end of the channel pair is copied into the kernel memory of the PDD by the operating system and the PDD copies it to the buffer of the other end of the channel pair.

The PDD supports an I/O control interface via the ioctl system call. Most file oriented ioctl get/set commands are supported subject to the limits of the underlying operating system. The ioctl command to seek to a different position in the file is supported. The implementation of the seek command on a striped/encoded file is somewhat involved. The PDD is only a pass through and the actual implementation is described as part of the PeerService and PeerServer.

Virtual File System:

A file system is the software component of an operating system that manages the organization of data on its storage devices. A file system allocates space on storage devices to store file contents. A file system creates a hierarchy of directories to facilitate cataloging of the files. Directories are files whose contents are managed by the file system. The syntax of directory paths and representation of storage devices are operating system specific. Typical file systems view each logical storage device as a self-contained repository with a single root directory. From the file system aspect, files do not logically span storage devices. Even when the hardware supports this functionality, such as is the case with RAID, the RAID controller shields the file system by behaving as a single storage device. A file entry within a directory describes, among other data, the sequence of storage device blocks that make up the file.

Access to data on remote file systems is achieved via a network through a Virtual File System (VFS). A VFS does not manage file a directories directly. A VFS communicates with its file system for local file path transactions and with a remote VFS for remote file path transactions. Several VFS are presently available including NFS and CIFS.

Embodiments of the present invention define a true VFS in which files are not wholly contained within a single storage device or operating system or file system. The VFS distributes (stripes) the contents of a file across a cluster of Storage Systems (e.g., storage devices, operating systems and file systems). There is no single point of control for such a VFS, as access to its contents requires the collaboration of a cluster of Storage Systems (subject to the FEC parameters). The advantages of load balancing in this system are described below.

One advantage is the improvement in storage device I/O performance. A historical bottleneck has been the growing divergence between the capacity of storage devices and their ability to transfer data in and out. The present invention solves this problem by reducing the I/O load of each Storage System through the striping of data across a cluster of Storage Systems.

Another advantage is the balancing of storage capacity utilization across the cluster. With the present file systems, it is common for one storage device to be filled to capacity thereby causing the failure of applications. The disruptions occur even though another storage device with large available capacity is available within the same file system because file systems require files to be localized within a single storage device. Disruptions also occur even though storage capacity is available through the VFS because of difficulties in dividing large sets of files that are logically related. Therefore a lot of capacity available on storage devices is unused, as it may be too complex to use efficiently. Embodiments of the present invention maximize the storage capacity utilization by spanning multiple storage devices, which also decreases the storage utilization of any single storage device.

Peer-to-Peer Communication through the Multicast Burst Protocol:

Embodiments of the present invention rely upon the IP protocol to ensure packets successfully transmitted are free of corruption. As UDP/IP is used, some packets of some systems may be lost in transmission, duplicated or transmitted out of order. These are detected through the system's communication protocol, as are the packets that are never transmitted due to the complete unavailability of some Storage Systems. Every UDP/IP packet encapsulates potentially a plurality of codeword segments that have a corresponding logical position within the original content. Because UDP/IP enforces packet boundaries, a packet loss represents erasures on segment boundaries, which facilitates its identification and recovery. Upon determining that a packet was lost, the system can determine the corresponding codeword segments and mark these segments as erasures for recovery. A packet loss can be pre-determined as the initial peer-to-peer negotiation protocol discovers that some Storage Systems are unavailable and therefore all their packets are lost. A packet loss can also be dynamically determined through a variety of means during data transmission such as time-outs, NACKS and protocol requests.

TCP/IP requires a dedicated socket for every point-to-point connection. Sockets are a limited resource of the operating system and a large cluster would require many point-to-point connections. Thus, with TCP/IP the operating system may run out of sockets thereby introducing a potential single point of failure into the system. Through the use of UDP/IP embodiments of the present invention are able to limit the consumption of sockets to one per Storage System per session. These properties make the UDP/IP network a well-suited erasure channel for the FEC coding method.

The limitations of the UDP/IP protocol result in the necessity to manage the flow of packets to ensure that:

The packets are received by their intended recipients

Any redundant packets are ignored

Any out-of sequence and missing packets are properly processed

The Multicast Burst Protocol (MBP) ensures the reliability and performance of the Storage System cluster communication.

To ensure that their intended recipients receive the data packets requires some form of acknowledgement from the recipients. The overhead of transmitting an ACK packet for every data packet by every recipient would have a disastrous impact on performance proportional to the size of the Storage System cluster. Each data packet would require an ACK packet from every Storage System in the cluster. Thus, many more ACK packets would be transmitted than data packets. Furthermore, all things being equal ACK packets have the same likelihood of getting lost as data packets.

As part of the session initialization, the MBP enlarges the size of the socket kernel buffer to that configured for the cluster. The MBP is then able to transmit clusters of packets in multicast bursts up to the size of the socket kernel buffer while minimizing packet loss due to UDP/IP. The MBP also wraps each packet into its own MBP packet header describing the burst number, the packet number within the burst, the packet count of the burst, the MBP command, the source Storage System and the destination Storage System(s). Thus, each MBP packet is self-described, allowing duplicate packets to be ignored and out of sequence packets to be buffered.

The recipients detect the end of an MBP packet burst when all the expected packets are received at which point they transmit an ACK packet to the burst transmitter. At the end of the MBP burst, the transmitter collects the ACK packets from all the recipients. When some ACK packets are missing, either because of UDP/IP artifacts or because some of the intended recipients are missing some burst packets, the transmitter issues a NOOP packet. The NOOP packet triggers any recipient still waiting for packets to reply with a NACK packet that lists all of its missing packet numbers. The transmitter collates all the missing packet numbers from all the NACK packets and merges them into a single list. The packets in this list are transmitted in a new multicast burst, thereby ensuring that no extra network bandwidth is used for duplicate packet losses between Storage Systems. The process repeats until the all the ACK packets are received.

The data packets transmitted in a single burst can range from tens to hundreds or even thousands based upon the configuration of the Storage System cluster size and the socket kernel buffer size. This communication system is very efficient as ACK packets are transmitted per burst and NACK packets describe all the missing data packets for the current burst.

Each MBP session creates a multicast group with a default, pre-configured or specific multicast address and unique ephemeral port number that is the result of negotiation between the Storage Systems.

Deriving the Cluster of Storage Systems Dynamically:

A request to stage content can specify the FEC coverage desired in terms of an absolute Storage System count of a percentage of the cluster eventually assembled. It can specify the exact list of Storage Systems to use as the storage cluster. Most of the time such a list imposes unnecessary constraints on the system as it removes its ability to balance the load through its own selection of Storage Systems. A request can specify the minimum count of Storage Systems per cluster, as well as the replication count (e.g., the count of clusters). It is possible for a request to simply specify that all known Storage Systems are candidates and let the system assemble a cluster. A request can also specify pools of Storage Systems to use and pools of Storage Systems to avoid as well as additional Storage Systems to use or avoid. All parameters except for the source file path can be site-configured or defaulted and thus, do not have to be specified.

Figure 9:
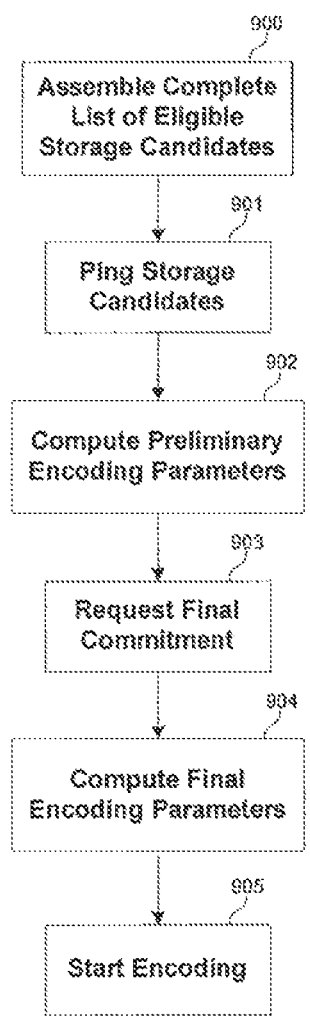
FIG. 9 depicts a flowchart of the process used to dynamically assemble a cluster of Storage Systems for staging purposes.

In one embodiment, the system assembles the cluster of Storage Systems through negotiations with the Storage Systems as depicted in FIG. 9. The system starts by sending ping commands (901) to the candidate Storage Systems to ascertain their availability. Any that do not reply to the ping protocol are eliminated from the list of candidates. The preliminary count of Storage Systems per cluster (902) is determined based upon the count of available Storage Systems and the count of replications requested. If insufficient Storage Systems are available to satisfy the FEC parameters, the transaction is aborted. The system then requests final commitment from the available Storage Systems (903). If the count of Storage Systems committing to the transaction is different, the encoding parameters are recomputed and if the new parameters are insufficient to satisfy the FEC parameters, the transaction is aborted. Once the cluster has been finalized, it is possible to compute the final parameters (904) and start encoding (905).

Figure 15A:
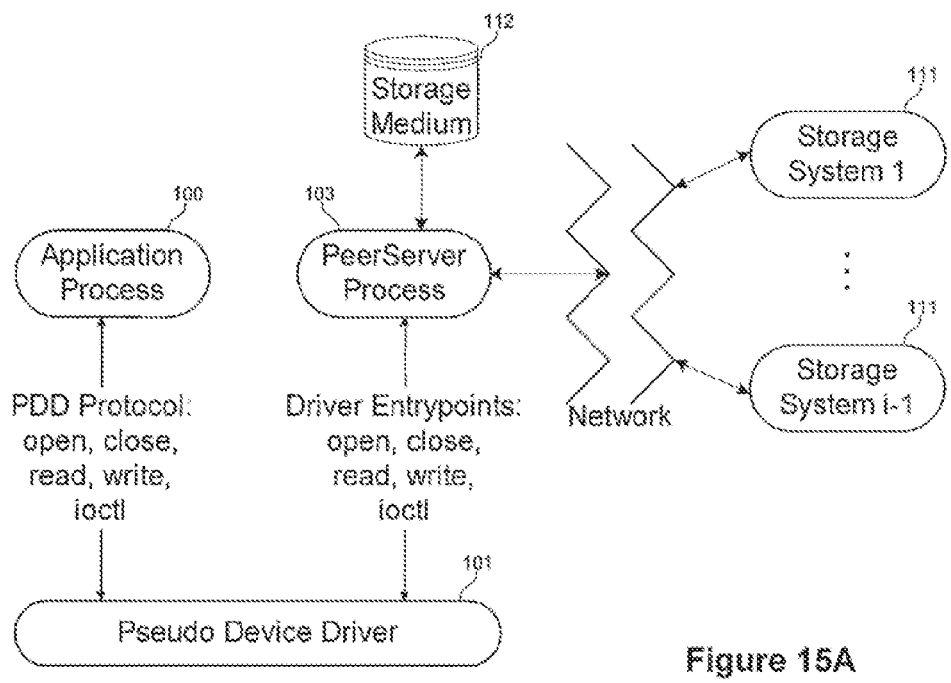
FIG. 15A depicts a block diagram according to one embodiment of the Programmatic Interface in which the client application is running on one of the Storage Systems.
Figure 15B:
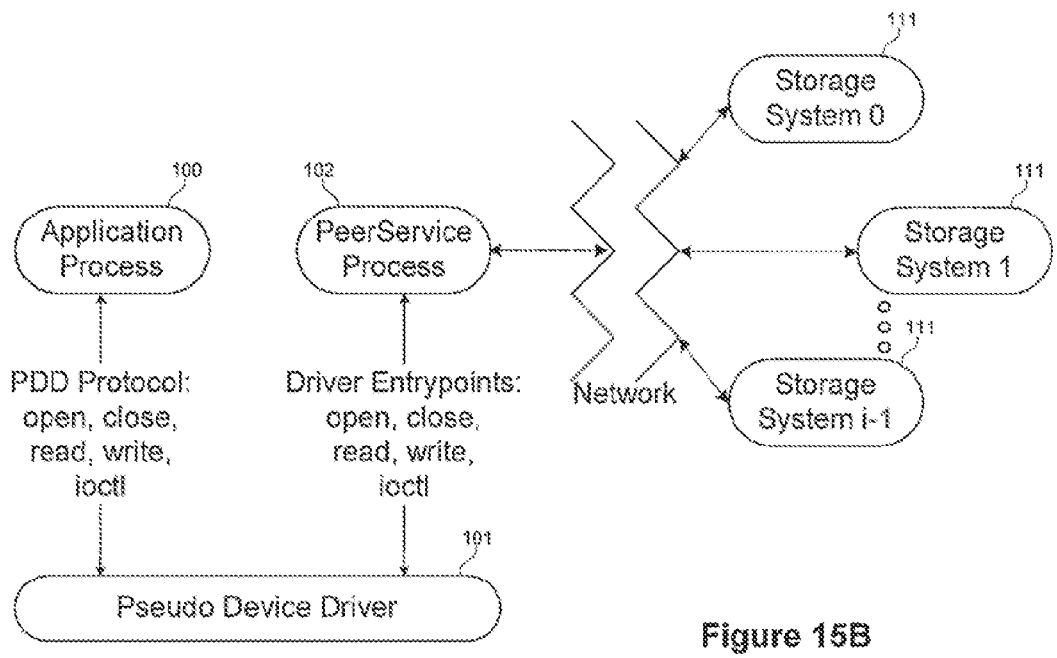
FIG. 15B depicts a block diagram according to one embodiment of the Programmatic Interface in which the client application is not running on one of the Storage Systems.

High Performance Content Staging Implementation:

In one embodiment, (see FIG. 15B), for content to be staged onto a cluster of Storage Systems, Application Process 100 must specify a file path that includes a device controlled through the Pseudo Device Driver 101. If the Application Process 100 is running on one of the Storage Systems 111 (see FIG. 15A), the PDD will communicate directly with the PeerServer Process 103. If the Application Process 100 is not running on a Storage System (see FIG. 15B), the PDD 101 will communicate directly with the PeerService Process 102 and the latter will communicate via UDP/IP (multicast) with the PeerServer Processes running on the Storage Systems that correspond to the pseudo device of the file path. The PeerService Process 102, when used (see FIG. 15B), multicasts the file path along with a request for a storage session to the cluster of Storage Systems. All Storage Systems that receive the message look for the file path in their local storage medium and send back an ACK message if the file can be accessed (read/write, ownership, etc.) or a NACK message otherwise. If the PeerServer Process 103 is communicating directly with the PDD (see FIG. 15A), it will perform the access check for the file in its local storage medium and then multicast the same request as the PeerService Process 102. When all Storage Systems have replied (or timed-out) and a sufficient count of Storage Systems is available to fulfill the minimal required count as configured for FEC, either the PeerService Process 102 or the PeerServer Process 103, as appropriate, multicasts the preliminary HMF data along with a request for commitment to the storage session to the cluster of Storage Systems. The preliminary HMF data enables the participating Storage Systems to open a file using a relative path derived from the original path on the local storage medium for write access, compute the RLUT 1100, setup the default Erasure Signature and configure the MBP Engine 109. Upon successful commitment by sufficient Storage Systems, the data transfer can begin, otherwise an error is returned to the Application Process 100 via the PDD 101. The Application Process drives the data transfer as it sends data via write and ioctl commands through the PDD 101 that forwards it to the PeerService Process 102 or PeerServer Process 103. The MBP Engine 109 manages the input buffering and the encoding is driven by the RLUT 1100. When the process of staging is terminated (e.g., by the PDD issuing a close command), the PeerServer Process 103 or the PeerService Process 102 (whichever is connected to the PDD) will generate the final HMF data and transmit it to the cluster of Storage Systems so it can be prepended to their local files.

Figure 7A:
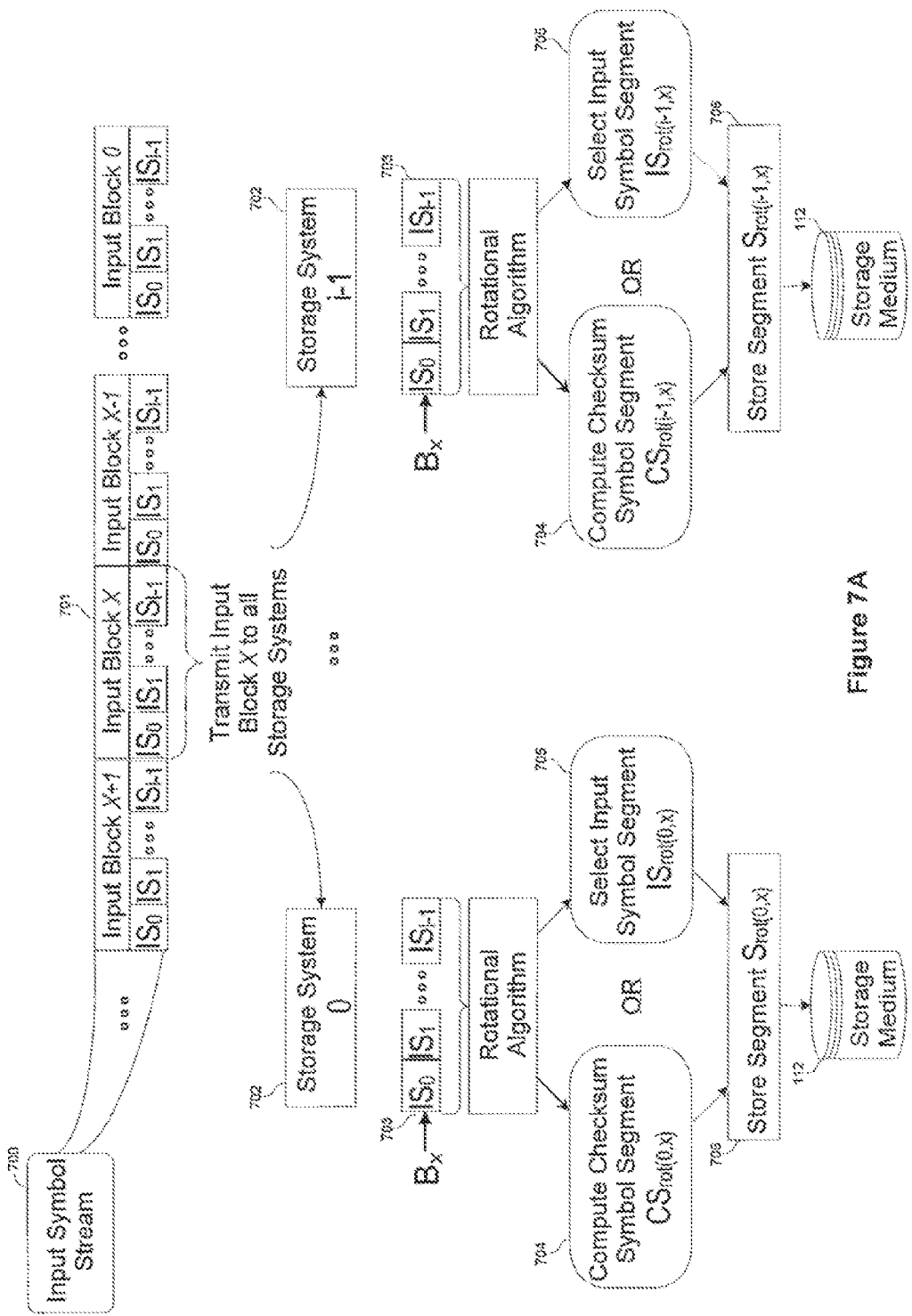
FIG. 7A depicts the High Performance Encoding System according to one embodiment of the present invention where all the Storage Systems in a cluster perform on a rotational basis the encoding computation corresponding to the FEC parameters specified.

Referring to FIG. 7A, the Input Symbol Stream 700 originating at the Pseudo Device Driver 101 produces a sequence 701 of Input Blocks of codeword payloads. In this system, the sequence of input symbols is aggregated into buffers that consist of multiple blocks of codeword payload (input symbol segments) and are transmitted to the Storage Systems via the MBP. The Storage Systems then perform on a rotational basis the encoding computation and storage of their corresponding checksum symbols segments and storage of their corresponding input symbol segments.

A codeword payload has the entire sequence of input symbol segments for one codeword. The count/of input symbol segments per block equals the count of Storage Systems in the cluster. The size of each Input Block is 1*j*w, where j is the count of symbols per segment and w the size of each symbol in bytes. Each Input Block 701 is transmitted to each cluster of Storage System 702 via the Multicast Buffer Protocol as a UDP/IP packet. Each Storage System uses its own assigned unique sequence number y and the Input Block number $B_x$ 703 as input to the Rotational Algorithm to determine whether it should compute a checksum symbol segment 704 $CS_{rot(y,x)}$ and store it or just select one input symbol segment 705 $IS_{rot(y,x)}$. Either way a symbol segment 706 is stored on the local storage medium 112.

High Performance Content Retrieval Implementation:

In one embodiment, for content to be retrieved from a cluster of Storage Systems, Application Process 100 must specify a file path that includes a device controlled through the Pseudo Device Driver 101. If the Application Process 100 is running on one of the Storage Systems 111 (see FIG. 15A), the PDD will communicate directly with the PeerServer Process 103. If the Application Process 100 is not running on a Storage System (see FIG. 15B), the PDD 101 will communicate directly with the PeerService Process 102 and the latter will communicate via UDP/IP (multicast) with the PeerServer Processes running on the Storage Systems that correspond to the pseudo device of the file path. The PeerService Process 102, when used, multicasts the file path along with a request for the corresponding HMF data to the cluster of Storage Systems. All Storage Systems that receive the message look for the file path in their local storage medium and forward the HMF header if the file is found or a NACK message otherwise. If the PeerServer Process 103 is communicating directly with the PDD (see FIG. 15A), it will try to locate the file in its local storage medium. If the file is found, PeerServer Process 103 loads the HMF data and then multicasts a request to the cluster of Storage Systems that they confirm their readiness to provide the content of the corresponding files on their local storage mediums. When all Storage Systems have replied (or timed-out) and a sufficient count of Storage Systems is available to satisfy the minimal required count as configured for FEC, either the PeerService Process 102 or the PeerServer Process 103, as appropriate, multicasts a request for commitment to the retrieval session to the cluster of Storage Systems. This request causes the participating Storage Systems to open the file on their local storage medium for read access, compute the RLUT 1100, setup the default Erasure Signature and configure the MBP Engine 109. Upon successful commitment by sufficient Storage Systems, the data transfer can begin, otherwise an error is returned to the Application Process 100 via the PDD 101. The Application Process drives the data transfer as it requests data via read and ioctl commands through the PDD 101 that forwards it to the PeerService Process 102 or PeerServer Process 103. The MBP Engine 109 manages the input buffering and the decoding is driven by the RLUT 1100.

Figure 7B:
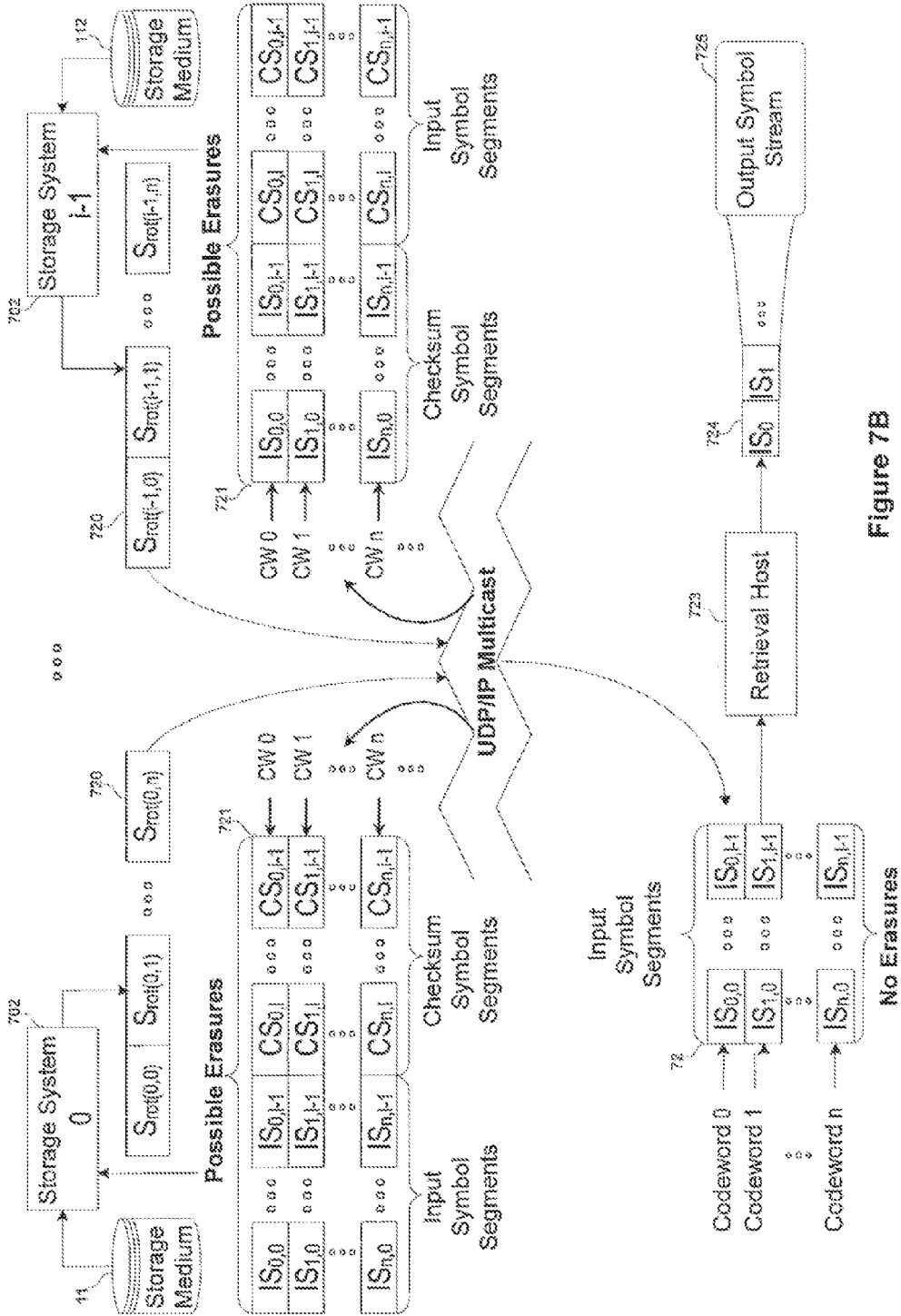
FIG. 7B depicts the High Performance Decoding System according to one embodiment of the present invention compatible with the High Performance Encoding System.

In a first embodiment of the peer-to-peer data transmission in the present invention as depicted in FIG. 7B, the content retrieval is performed on a buffered basis. The buffer has an integral number of codewords and is configured as per the latency requirements of the storage application. Each Storage System in the cluster of up to i Storage Systems 702 (depending upon availability) transmits via UDP/IP multicast an ordered sequence of symbol segment 720 to the multicast group recipients. The recipients include all the other Storage Systems in the cluster 702 and the Retrieval Host 723. Each symbol segment $S_{rot(a,b)}$ 720 aggregated by the recipients is either an input symbol segment $IS_{a,b}$ or a checksum symbol segment $CS_{a,b}$ depending upon its RLUT 1100 position computed using a and b. Where a is the Storage System number within the cluster of Storage Systems and b is the segment number within the codeword. The recipients use the symbol segments to reassemble codewords 721 in the Storage Systems and codewords 727 in the Retrieval Host. All recipients discover simultaneously any symbol segment erasures (missing packets) in codeword aggregates 721. All members of the cluster of Storage Systems recover (decode) the erasures on a rotational basis and transmit the recovered segments to the Retrieval Host 723. The Retrieval Host 723 forwards only the input symbol segments 722 ($IS_{(c,0)}$, . . . , $IS_{(c,I-1)}$), to the Output Symbol Stream 725. Where c is the codeword number in the sequence.

In a second embodiment of the peer-to-peer data transmission in the present invention, network traffic is decreased so as to improve performance. The twelve-peer cluster depicted in FIG. 11B and FIG. 11C, is encoded at forty percent FEC, resulting in codewords consisting of seven input symbol segments and five checksum symbol segments. The network traffic savings achieved are described in terms of complete RLUT rotations in order to represent completely all failure combinations. Sequential content retrieval can be represented as a series of RLUT traversals. For simplicity the assumption is made that each symbol segment transmitted requires one packet, though depending upon the size of the segments, clustering of multiple segments per UDP/IP packet may be desirable. Also for simplicity, no accounting is made of UDP/IP artifacts requiring packet retransmission, though the number of such retransmission is proportional to the number of packets transmitted and therefore decreases as the network traffic decreases. In the first embodiment of the peer-to-peer data transmission, the transmission of a complete RLUT rotation requires p=i*i packets as that is the number of packets required to completely transmit every segment of every codeword (i codewords in the RLUT and i segments per codeword). For the RLUT depicted in FIG. 11C, the total number of packets is p=144. In this second embodiment, operating on a buffered basis, each available Storage System in the cluster transmits via UDP/IP a sequence of input symbol segments. No additional transmission is necessary when there are no erasures as is the case the vast majority of the time. This nominal condition requires p=i*l packets, where the number of input symbol segments l=7 and therefore, p=84 for a savings of 41% in network traffic over the first embodiment. When erasures occur, the number of checksum packets required to repair each codeword varies based upon the location of the codeword in the RLUT. Specifically, the actual peers that fail is not material as the RLUT is evenly distributed across all codewords and all segments. One checksum symbol segment packet must be transmitted for each input symbol segment erasure and then the recovered input symbol segment must be transmitted in turn. Thus, the number of packets required to transmit a complete RLUT in the second embodiment is p=i*l+2*e where e is the number of input symbol erasures over the entire RLUT and e≤k<i.

For example, referring to FIG. 11C, were Storage Systems Peer 10 and Peer 11 to fail, the remaining peers carrying checksum symbol segments would be able to recover as follows:

Codewords 2, 4, 9 and 11 would require no recovery as they retain all 7 input symbol segments and therefore require no additional checksum symbol segments.

Codewords 6 and 7 would each require only one additional checksum symbol segment as they consist of 6 input symbol segments and 4 checksum symbol segments.

Codewords 0, 1, 3, 5, 8 and 10 would each require only two additional checksum segments as they consist of 5 input symbol segments and 5 checksum symbol segments.

The number of packet transmissions required for erasure recovery would be 2 packets for codewords 6, 7 and 12 packets for codewords 0, 1, 3, 5, 8, 10. As each codeword must also transmit the recomputed input symbol segment(s), the total number of packets is p=12*7+2*(2+12)=112 for a savings of 22% in network traffic over the first embodiment.

A more likely occurrence is the loss of a single Storage System, thereby causing one erasure per codeword, which amounts to a total of e=7 input symbol segment erasures. In this case, p=12*7+2*7=98 which is a 32% improvement in network traffic.

Self-Healing Cluster Implementation:

The cluster of Storage Systems is self-healing in that it is able to detect and repair the loss of any number of members up to the error correction tolerance specified when the content was encoded. Content healing can be initiated manually through the Administration Tool 105. The system can be configured to periodically verify the availability of the content. If so configured through the Administration Tool 105, content healing is initiated automatically when the system detects that the cluster of Storage Systems is not complete. A complete cluster of Storage Systems is one in which all the Storage Systems are accessible and report that their local content is available. Content healing can be initiated for one or more files or for the entire cluster. It can be initiated if some members of a cluster fail during the staging of content. In this case, the healing proceeds simultaneously with the staging of the content with no impact on performance and no loss of data. A cluster of Storage Systems that exceeds its error correction tolerance is a failed cluster and cannot be recovered unless a replicated cluster is available from which to heal. An incomplete cluster within the bounds of its error correction tolerance can be healed as well as have its content retrieved simultaneously with no impact on performance beyond minimal disk access and network bandwidth. This is because the error recovery computation of the healing process, and therefore the vast majority of the overhead, is distributed equally across the entire cluster including the (empty) Storage System being healed.

The pull_verify command is usually the way to determine if a file should be healed. This command is a subcommand of the pull command of the retrieval process. For example, the Administration Tool 105 multicasts a pull_verify command along with a VFS file path to poll the cluster and determines that its cluster is not complete. Potential replacement Storage Systems are identified that are not part of any of the HMF's replications (starting at replication 0). All Storage Systems automatically identify themselves to their cluster upon startup as part of the network discovery procedure. The final selection of the replacement Storage Systems is done through negotiations following the same protocol as the negotiations of the staging process. The replacement Storage Systems are assigned the segment id of the Storage Systems they are replacing. They are sent a heal command by multicast along with their segment id and the current HMF data. The entire cluster receives the command and prepares for its execution. Each replacement Storage System performs a content retrieval from the remaining cluster of Storage Systems. All the replacement Storage Systems are operating under the same heal transaction id and therefore are able to join the same multicast group and ephemeral port created for this transaction. The available Storage Systems provide their content is a manner similar to a content retrieval. A content heal differs from a content retrieval in one major and one minor aspects. The major aspect is that the content heal may have multiple Retrieval Hosts as multiple Storage Systems may be healed simultaneously. The minor aspect is that the error recovery of a content heal is not limited to input symbol segments as in content retrieval, but extends to checksum symbol segments as well. As codeword are aggregated, only the segments corresponding to the replacement Storage Systems (segment ids) are recomputed (through decoding). In most cases the range of codewords to repair is the entire content's codewords. If the content healing process is initiated while the content's staging is in progress, the range of codewords to repair is limited to those that were already transmitted to the failed Storage Systems. The staging process is joined by the replacement Storage System so that for any codewords beyond this high water mark, they are performing a staging transaction. Note that not all transactions are simply content retrieval (read only) or content staging (write only). Some transactions are a combination (read and write) with random access, which introduces a small complication, as access to a codeword that was already healed will benefit from the replacement systems, whereas access to a codeword not yet healed will only be serviced by the remaining Storage Systems. The failed Storage Systems are recorded in the Host Map File. This information is used to compile the reliability profiles of the Storage Systems.

Storage System Failure Detection and Correction During Transactions:

It is possible for Storage Systems to fail during transactions (e.g., staging, retrieval or healing). The system MBP Engine 109 detects failures through three mechanisms: I/O error, time-out and failure notification by another Storage System. Detecting the failure is relatively simple but taking corrective action can be complex based upon the transaction. Essentially, the system is able to take corrective action as long as a sufficient count of active Storage Systems remains to satisfy the minimal FEC parameters.

A failure during a staging transaction is manageable as long as a sufficient count of active Storage Systems remains to satisfy the minimal FEC parameters. Under such conditions, a heal transaction can be performed either while the staging transaction is in progress or at a later time. There is no action to take until such a time as a heal transaction is initiated by a new Storage System.

A failure during a retrieval or heal transaction requires that instant corrective measures be taken and propagated to the remaining Storage Systems in the cluster. The transaction is aborted if the count of active Storage Systems falls below that required to satisfy the minimal FEC parameters. Otherwise, the cluster is informed via a UDP/IP multicast message that a Storage System has failed. The implication is simply that the content from the failed Storage System will be erasures from this point on and that the entire remaining cluster will cooperate in order to repair the erasures. Every Storage System in the cluster can aggregate all symbol segments from every cluster member as these are sent via UDP/IP multicast. Thus, every remaining Storage System member has equal opportunity to repair the input symbol segment erasures of any given codeword. The Storage Systems distribute the repair work equally across the cluster by each decoding every other n segments belonging to the missing Storage Systems, where n is the number of remaining Storage Systems. Thus, they will aggregate all available symbol segments as illustrated in FIG. 7B (721) and then each will rotationally repair input symbol segment erasures and transmit them to the Retrieval Host 723 as illustrated in FIG. 7B (722). The Retrieval Host 723 is never aware that a failure has occurred and is therefore not disrupted. This recovery procedure accommodates multiple simultaneous failures, up to the FEC parameters configured.

Cluster Replication:

The replication of a cluster is the selection of one or more clusters of Storage Systems that will store the same content. There are several reasons to replicate storage clusters. One reason is higher availability when a cluster experiences a simultaneous failure count greater than the maximum recoverable error count for some encoded content. In this situation the option exists to use a replicated cluster, or to selectively use from the replicated cluster(s) only those Storage Systems that have failed. Where content has been replicated across one or more storage clusters, it is possible to recover from Storage System failures in one cluster (whether catastrophic or not), by using the corresponding Storage Systems in the replicated clusters. All the recovery scenarios presented take place without impacting the availability of the content or the performance of its retrievals.

Another reason for replicating clusters is to achieve better performance during content retrievals. Very popular content will be retrieved very often. It is conceptually possible to overwhelm a cluster of Storage Systems no matter how many Storage Systems have been included in the content's cluster in order to improve performance and reliability. The availability of another cluster of Storage Systems with the same content (through replication or otherwise) provides another means of ensuring scalability and maintaining the performance level desired.

Cluster replication can be done at any time. One way is to indicate a replication count as part of the content staging parameters. This will cause the replication to occur as the content is being staged. Performance is not impacted as the replicated cluster joins the UDP/IP multicast group and has equal access to the data without increasing the network (or computational or storage device I/O) load. Another way is to replicate some content on the cluster after it has been staged. This may be necessary as the popularity of the content may prove to be greater than originally anticipated when it was first staged. Thus, embodiments of the present invention provide scalability and performance that can be dialed up at any time. It is possible to configure the system to define several fixed Storage System clusters of the same size and enable replication onto them by default. If this configuration is adhered to permanently, the effect is akin to software mirroring of the Storage Systems.

Cluster Restriping:

The restriping of a cluster of Storage Systems can occur when the count of cluster is reconfigured through the addition or removal of Storage Systems. The new count of cluster members changes the size of the stripes. When Storage Systems are added (typically to augment the storage capacity and the codec performance), restriping will redistribute the storage load to leverage the capacity and I/O throughput of the new members. Therefore subsequent content retrieval will leverage fully the enlarged cluster. When Storage Systems are removed (typically because they were underutilized), restriping will redistribute the storage load to eliminate FEC overhead during retrievals due to the missing Storage Systems. Note that unlike RAID, a Storage System does not have to be restriped if storage mediums are added or removed. Restriping takes place without impacting the availability of the content.

Cluster restriping is implemented as a retrieval transaction coupled with a storing transaction. Thus, the retrieval transaction uses the existing HMF data and the storing transaction creates a new HMF that reflects the changes in the cluster. Upon the successful completion of the cluster restriping for each file, a new file is produced that replaces the old file and the latter is deleted.

The Host Map File Implementation:

Upon successful completion of the staging of content, the Host Map File (HMF) data is produced describing fully how to locate and access the staged content. FIG. 10A depicts the grammar of the HMF, FIG. 10B depicts a sample HMF and FIG. 10C depicts tables that describe the various constructs of a HMF grammar. The HMF describes the original content and the encoding parameters in the header construct 1001. The sub-constructs of header construct 1001 are described in table 1003. Each cluster replication, including the initial staging (denoted as "replication 0"), is described in subsequent replication construct 1002. The sub-constructs of replication construct 1002 are described in table 1003 and table 1004.

The HMF data is the only means to retrieve content that has been staged and to purge staged content from its cluster. The HMF data is also used to verify that content can be retrieved and whether it needs to be healed. This entails attempting to contact every Storage System in the original cluster to ascertain that a sufficient subset is available to retrieve and if necessary decode the content. The HMF data is not a single point of failure because it is stored as the header of every stripe file. Thus, it is possible to reconstruct the original content starting from any stripe file on any Storage System.

A First Embodiment

A first embodiment of the present invention is a content-on-demand distribution system. In this embodiment computers with available storage capacity and broadband access to the Internet join to form communities of peers. Content stored in any cluster of Storage Systems within a community is potentially available to all the members of the community. The content does not have to be replicated to ensure high-availability or performance as embodiments of the present invention address both. Other benefits arise if the community has subscribers to an ISP service. The ISP will save on bandwidth charges, because the data transmitted between communities of subscribers will remain within the ISP's network, as it is not routed through the Internet backbone. The asymmetric nature of the bandwidth of broadband to the home (xDSL, cable modem, etc.) fits very well the model of many Storage Systems transmitting to one recipient as download bandwidth is greater than upload bandwidth.

A Second Embodiment

A second embodiment of the present invention is a video-on-demand/audio-on-demand streaming system. The requirements for this embodiment to function are similar to the content-on-demand distribution system previously described. Here the content is to be streamed rather than transferred as it has both video and audio material. One such community could be one or more head ends of a cable provider and the Storage Systems could be the set-top boxes (STB's) provided to the customers. Another such community could be Private Video Recorder (PVR) owners that subscribe to a service. Current STB/PVR technology is converging with computer technology in that both have the most important attributes required for embodiments of the present invention (e.g., a processor, memory, a large capacity hard disk drive, access to broadband, etc.). Further, STB/PVR's are directly connected to conditional access systems and televisions thereby ensuring secure access to the HMF, payment for the audio/video content as well as an ideal medium for viewing the content. The content is secure as it is encrypted before transmission and it is streamed so it may only be stored on the playback STB/PVR subject to the content provider's authorization. Content is distributed across clusters of STB/PVR's with replications as necessary to ensure sufficient streaming performance based upon the popularity of the content. Other networking technologies to the home such as DSL and broadband wireless can also be used for this purpose, though this is less practical until the viewing device (television) is part of the home network.

A Third Embodiment

A third embodiment of the present invention is a high-availability storage management system. In this enterprise environment, off-the-shelf PC's are clustered into a seamless high-performance and highly available storage solution. Very large data sets can be staged providing highly reliable access that can withstand multiple simultaneous failures. The failures are not simply at the component level (e.g., processor, memory, RAID, etc.) but at the entire system level. Embodiments of the present invention stripe the content not across spindles of a single RAID, but across entire systems that themselves may use RAID storage subsystems. In a conventional system, redundancy for hardware components entails a secondary/stand-by resource (e.g., dual controllers, entire system, etc.) and redundancy at the software level usually entails replication of the data onto another server. Yet most redundancy solutions guard against a single point of failure only and a second failure can disable the system. The cost of software suites (e.g., for replication, fail-over, on-line backup, virtualization, etc.) and high-availability hardware redundancy are very high. Embodiments of the present invention allow the failure tolerance to be dialed up to the desired level. For example, it is possible to specify that some content to be staged upon 100 Storage Systems, tolerate a 20 percent failure (20 servers), or a 40 percent failure (40 servers) and even higher. Yet this flexibility and tremendous redundancy comes without the need to replicate the content and does not require extra or custom hardware. Another benefit of embodiments of the present invention is the inherent load balancing and security it provides. As the entire storage clusters participate in the staging (encoding) and retrieval (transmission) process, the burden is evenly spread. As previously discussed, the distribution and encoding of the content adds to its security.

A Fourth Embodiment

A fourth embodiment of the present invention is an on-line backup system. In the enterprise environment, this system is able to use all spare storage capacity across computers as a seamless repository. The system is able to use storage across computers without compatibility concerns about the hardware manufacturers, operating systems, etc. As various computers in a local area network may have greater or smaller available storage capacity, it is often difficult to find a single disk with enough free space to store large content. Embodiments of the present invention are able to adjust the formation of clusters to use most available free disk space in underutilized systems.

A Fifth Embodiment

A fifth embodiment of the present invention is an off-line backup system. In the enterprise environment, this system clusters groups of tape drives to provide a high performance and high availability tape backup system. As on-line storage capacity grows into terabytes and beyond, it is becoming difficult to transfer to slow tape devices such large data sets. The large capacity of a single tape drive cannot match the HDD capacity of data centers. Multiple tapes have to be used in sequence to capture all the on-line data. Robotic tape systems exist to automate the swapping of tapes, however for most systems a single drive is used for storing and retrieving data. Embodiments of the present invention use banks of (robot controlled) tape drives to store and retrieve large data sets. The data is read/written in parallel to all the tape drives thereby multiplying their performance. A further benefit is that the system automatically recovers from broken tape drives or damaged/missing tapes through its FEC capability. The system has also the ability to heal the contents of a damaged tape by recreating the missing data thus, providing greater longevity to off-line backups.

A Sixth Embodiment

A sixth embodiment of the present invention is a hardware implementation of the Storage System (see FIG. 1A) whereby the electronics required are reduced to a single board or chip encompassing a processor, memory, a network communications interface (e.g., Ethernet, Fibre, etc.) and a storage medium interface (e.g., SCSI, IDE, PCI, etc.). The encoding and decoding computation are performed over Galois fields and therefore require table lookup, XOR and boundary checking operations. A chip implementation of the codec will off-load the general-purpose processor and provide better performance. The hardware implementation attaches directly to the storage medium and to the network thus, affording unprecedented flexibility. Such units can be physically located anywhere on the network; they can be moved as needed; their cost is so low that they require no maintenance or repair, and instead are simply replaced upon failure.

A Seventh Embodiment

A seventh embodiment of the present invention provides a way of protecting contents on distribution media such as music, videos, games and software against piracy. Content would be encoded with erasures such that the actual content is incomplete as well as augmented with checksum symbols. Thus, directly copying it from the distribution media to a computer hard disk would include the erasures. The erasures would make the content on the hard disk useless for playing, for sharing or other unauthorized distribution. When accessing from the intended media player (e.g., a CD player, a game console, etc.), the erasures are dynamically repaired in memory and the content is whole again for that device. The erasures do not have to be very large, as for example, simply erasing most the MPEG structures of audio/video content would render it useless. The HMF data is stored on the CD and may be encrypted.

Although only a few embodiments have been described in detail above, those having ordinary skill in the art will certainly understand that many modifications are possible in the embodiments without departing from the teachings thereof.

All such modifications are intended to be encompassed within the following claims.

What is claimed is:

1. A method of storing data in a clustered data processing system, comprising the steps of:
   receiving, by a plurality of available peers in the system, a set of more than one input symbol segment for a first codeword, each of the plurality of available peers receiving all of the input symbol segments in the set;
   in response to the step of receiving, a first group of at least two of the available peers each storing a respective one of the input symbol segments for the first codeword, none of the peers in the first group retaining for the first codeword all of the input symbol segments for the first codeword; and
   in response to the step of receiving, a second group of the available peers each generating and storing a respective checksum symbol segment for the first codeword, based on the input symbol segments for the first codeword, each of the checksum symbol segments generated by the second group of peers for the first codeword having contents that, in conjunction with a first subset of fewer than all of the input symbol segments for the first codeword, is sufficient to recover one of the input symbol segments for the first codeword which is not in the first subset.

2. A method of retrieving data in a clustered data processing system, comprising:
   receiving, by a plurality of available peers of the system, a content request for delivery of data to a retrieval destination, the content request covering data in a first codeword;
   in response to the step of receiving, a first group of at least two of the available peers each transmitting toward the retrieval destination a respective input symbol segment stored by the peer, the transmitted input symbol segments also being received by a second group of the available peers different from the retrieval destination;
   detecting erasure of a first input symbol segment which is covered by the content request;
   in response to the step of detecting, a first peer in the second group of peers regenerating the first erased input symbol segment in dependence upon a first checksum symbol segment stored by at least one of the available peers and in further dependence upon ones of the input symbol segments transmitted in the step of transmitting; and
   transmitting the regenerated first input symbol segment toward the retrieval destination.

3. A method of healing a clustered data processing system having a plurality of peers, comprising the steps of:
   providing in the clustered data processing system a plurality of stored codewords each having at least one input symbol segment and at least one checksum symbol segment, the codewords being stored in the data processing system such that a respective erased subset of the symbol segments of each of the codewords in the plurality of stored codewords is missing;
   for each i'th one of the codewords in the plurality of stored codewords, a respective i'th regeneration group of at least one of the peers regenerating the erased subset of symbol segments of the i'th codeword, in dependence upon available ones of the symbol segments of the i'th codeword; and
   for each i'th one of the codewords in the plurality of stored codewords, a respective i'th healing group of at least one of the peers storing the symbol segments regenerated by the i'th regeneration group of the peers.

4. A method of operating a clustered data processing system having a plurality of peers, for use with a plurality of codewords each having at least one input symbol segment and at least one checksum symbol segment, comprising the steps of:
   receiving a plurality of input symbol segments to store for a first codeword;
   available ones of a storage group of at least one of the plurality of peers each storing a respective one of the input symbol segments;
   available ones of a checksum group of at least one of the plurality of peers each generating and storing a respective checksum symbol segment for the first codeword, in dependence upon the received plurality of input symbol segments for the first codeword;
   receiving a content request from a content requestor covering input symbol segments in the first codeword, an erased subset of at least one input symbol segment covered by the content request being missing from the first codeword as stored in the data processing system;
   available ones of the storage group of peers each transmitting, at least toward a retrieval destination, input symbol segments stored for the first codeword;
   a regenerating group of the plurality of peers regenerating the erased subset of input symbol segments in dependence upon the transmitted input symbol segments, and transmitting the regenerated erased subset of input symbol segments at least toward a retrieval destination.

5. The method according to claim 4, further comprising the step of a healing group of the plurality of peers receiving and storing the regenerated erased subset of input symbol segments so that the regenerated subset is available for future content requests.

* * * * *

UNITED STATES PATENT AND TRADEMARK OFFICE
CERTIFICATE OF CORRECTION

| | | |
|---|---|---|
| PATENT NO. | : 8,626,820 B1 | Page 1 of 1 |
| APPLICATION NO. | : 12/701884 | |
| DATED | : January 7, 2014 | |
| INVENTOR(S) | : Levy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this
Twelfth Day of May, 2015

Michelle K. Lee
*Director of the United States Patent and Trademark Office*